(12) United States Patent
Fuller et al.

(10) Patent No.: US 6,411,682 B1
(45) Date of Patent: Jun. 25, 2002

(54) COMPUTER CONTROLLED PAGING AND TELEPHONE COMMUNICATION SYSTEM AND METHOD

(75) Inventors: Robert M. Fuller, Issaquah, WA (US); Richard P. Berg, Thousand Oak, CA (US); Daniel R. Kranzler, Bellevue, WA (US)

(73) Assignee: Aspect Telecommunications Corporation, San Jose, CA (US)

(*) Notice: Subject to any disclaimer, the term of this patent is extended or adjusted under 35 U.S.C. 154(b) by 0 days.

(21) Appl. No.: 08/809,607

(22) PCT Filed: Sep. 21, 1995

(86) PCT No.: PCT/US95/12318

§ 371 (c)(1), (2), (4) Date: Mar. 24, 1997

(87) PCT Pub. No.: WO96/09731

PCT Pub. Date: Mar. 28, 1996

(51) Int. Cl.[7] .......................... H04M 1/64; H04M 11/00; H04M 3/42
(52) U.S. Cl. ................ 379/67.1; 379/88.15; 379/93.35; 379/142.08; 379/170; 379/208.01; 379/209.01
(58) Field of Search .......................... 379/67.1, 88.01, 379/201, 210, 211, 212, 207, 233, 88.15, 88.21, 70, 74, 93.35, 142.08, 170, 179, 201.01, 201.07, 208.01, 209.01, 214.01, 215.01; 455/31.2, 461, 445, 417

(56) References Cited

U.S. PATENT DOCUMENTS

| | | | |
|---|---|---|---|
| 2,272,947 A | 12/1942 | Nilsson | 340/825.4 |
| 2,957,047 A | 10/1960 | Wennemer | 379/211 |
| 2,966,554 A | 12/1960 | Dubois | 379/355 |
| 3,178,516 A | 4/1965 | Bonanno | 379/211 |
| 3,182,134 A | 5/1965 | Hochgraf | 379/112 |
| 3,506,791 A | 4/1970 | Halaby | 174/50 |
| 3,614,328 A | 10/1971 | McNaughton et al. | |
| 3,627,955 A | 12/1971 | Stone | |
| 3,676,603 A | 7/1972 | Budrys et al. | 379/355 |

(List continued on next page.)

FOREIGN PATENT DOCUMENTS

| | | |
|---|---|---|
| DE | 2542834 | 11/1976 |
| DE | 2522758 | 12/1976 |
| DE | 2929961 | 2/1981 |
| DE | 3411206 | 10/1985 |

(List continued on next page.)

OTHER PUBLICATIONS

CCITT Paper. "Universal Personal Telecommunication Definition and Attributes" Oct. 1989.
R.M. Fuller Co. Telexpand System 1. "Advanced Operations Manual" Appen. J. 1985.
Excerpt from Aspect Call Center "Workstation User's Guide" Release 1.0 pp. 110–119, 1987, with excerpts from a Release 2.0 of "Workstation User's Guide" pp. 78, 89–91 May 1988.

(List continued on next page.)

*Primary Examiner*—Allan Hoosain
(74) *Attorney, Agent, or Firm*—Ladas & Parry

(57) ABSTRACT

The invention provides a method and an apparatus for placing a caller into telecommunication with a subscriber. A call from the caller, directed to the subscriber, is detected and, in response thereto, a page is initiated to the subscriber and at the same time a forward leg call is initiated to a stored telephone address. If the call on the forward leg is answered, the party answering that call is placed in telecommunication with the caller. A call from the subscriber is also detected the subscriber is placed in telecommunication with the caller together with any party on a forward leg call.

32 Claims, 19 Drawing Sheets

Microfiche Appendix Included
(2 Microfiche, 157 Pages)

U.S. PATENT DOCUMENTS

| | | |
|---|---|---|
| 3,704,346 A | 11/1972 | Smith et al. ............... 379/88.21 |
| 3,739,329 A | 6/1973 | Lester ............................ 367/6 |
| 3,784,721 A | 1/1974 | Kilby |
| 3,800,283 A | 3/1974 | Gropper |
| 3,809,824 A | 5/1974 | Dahlquist et al. .............. 379/48 |
| 3,854,013 A | 12/1974 | Altenburger et al. ........ 379/211 |
| 3,898,390 A | 8/1975 | Wells et al. |
| 3,925,622 A | 12/1975 | Robinson ................. 379/92.04 |
| 3,959,600 A | 5/1976 | Sousa .......................... 379/157 |
| 3,963,873 A | 6/1976 | Pommerening et al. ........ 379/70 |
| 3,973,200 A | 8/1976 | Akerberg |
| 3,997,731 A | 12/1976 | Wilmot et al. .............. 379/88.2 |
| 4,028,498 A | 6/1977 | Mehaffey et al. ............ 379/199 |
| 4,028,500 A | 6/1977 | McClure et al. |
| 4,054,756 A | 10/1977 | Comella et al. .......... 379/88.21 |
| 4,057,757 A | 11/1977 | Darden, Jr. |
| 4,065,642 A | 12/1977 | McClure ................... 379/88.24 |
| 4,069,397 A | 1/1978 | Hashimoto ................. 455/31.2 |
| 4,071,699 A | 1/1978 | Jovic et al. |
| 4,072,824 A | 2/1978 | Phillips ....................... 455/413 |
| 4,086,438 A | 4/1978 | Kahn et al. ................. 455/31.2 |
| 4,107,473 A | 8/1978 | Pierce |
| 4,144,409 A | 3/1979 | Utano et al. |
| 4,150,255 A | 4/1979 | Theis et al. .................... 379/84 |
| 4,154,988 A | 5/1979 | Fechalos et al. |
| 4,162,377 A | 7/1979 | Mearns |
| 4,187,498 A | 2/1980 | Creekmore |
| 4,188,507 A | 2/1980 | Meri et al. |
| 4,191,860 A | 3/1980 | Weber |
| 4,209,787 A | 6/1980 | Freeny, Jr. ................... 379/210 |
| 4,242,539 A | 12/1980 | Hashimoto |
| 4,266,098 A | 5/1981 | Novak .......................... 379/77 |
| 4,266,102 A | 5/1981 | Stanley et al. ............... 379/394 |
| 4,277,649 A | 7/1981 | Sheinbein ................... 379/201 |
| 4,278,844 A | 7/1981 | Jones ........................... 379/157 |
| 4,296,282 A | 10/1981 | O'Neil et al. |
| 4,298,775 A | 11/1981 | Buck et al. .................. 379/217 |
| 4,313,025 A | 1/1982 | Grube, Jr. ................... 455/31.2 |
| 4,313,035 A | 1/1982 | Jordan et al. ................ 379/201 |
| 4,326,123 A | 4/1982 | Hosterman |
| 4,332,985 A | 6/1982 | Samuel ........................ 379/353 |
| 4,336,524 A | 6/1982 | Levine ......................... 455/561 |
| 4,342,882 A | 8/1982 | Gravenhorst et al. ........ 342/457 |
| 4,345,113 A | 8/1982 | Shelley .......................... 379/40 |
| 4,352,955 A | 10/1982 | Kai et al. |
| 4,361,851 A | 11/1982 | Asip et al. |
| 4,369,339 A | 1/1983 | Castro et al. ............. 379/93.14 |
| 4,371,752 A | 2/1983 | Matthews et al. |
| 4,393,278 A | 7/1983 | Miyoshi ...................... 379/252 |
| 4,413,158 A | 11/1983 | Danford ...................... 379/211 |
| 4,420,656 A | 12/1983 | Freeman ................... 379/88.04 |
| 4,424,418 A | 1/1984 | Moore et al. |
| 4,439,636 A | 3/1984 | Newkirk et al. |
| 4,442,321 A | 4/1984 | Stehman ....................... 179/18 |
| 4,447,676 A | 5/1984 | Harris et al. ................. 379/210 |
| 4,459,434 A | 7/1984 | Benning et al. ............. 370/271 |
| 4,475,009 A | 10/1984 | Rais et al. ................... 379/201 |
| 4,481,384 A | 11/1984 | Matthews |
| 4,488,005 A | 12/1984 | Frantz .......................... 379/73 |
| 4,503,288 A | 3/1985 | Kessler ................... 379/88.19 |
| 4,538,031 A | 8/1985 | Benning et al. ............ 379/102 |
| 4,567,323 A | 1/1986 | Lottes et al. |
| 4,577,062 A | 3/1986 | Hilleary ...................... 379/132 |
| 4,577,067 A | 3/1986 | Levy et al. |
| 4,578,540 A | 3/1986 | Borg et al. ................. 379/211 |
| 4,580,012 A | 4/1986 | Matthews et al. |
| 4,580,016 A | 4/1986 | Williamson |
| 4,581,486 A | 4/1986 | Matthews et al. |
| 4,584,434 A | 4/1986 | Hashimoto ................... 379/70 |
| 4,585,906 A | 4/1986 | Matthews et al. |
| 4,587,379 A | 5/1986 | Masuda |
| 4,591,664 A | 5/1986 | Freeman ....................... 379/73 |
| 4,595,983 A | 6/1986 | Gehalo et al. |
| 4,598,179 A | 7/1986 | Clark et al. ................. 379/197 |
| 4,601,064 A | 7/1986 | Shipley .................... 340/825.4 |
| 4,602,129 A | 7/1986 | Matthews et al. |
| 4,604,499 A | 8/1986 | Hughes |
| 4,607,144 A | 8/1986 | Carmon et al. |
| 4,608,458 A | 8/1986 | Hashimoto ................ 379/93.11 |
| 4,608,460 A | 8/1986 | Carter et al. ................. 379/201 |
| 4,611,094 A | 9/1986 | Asmuth et al. .............. 379/113 |
| 4,611,096 A | 9/1986 | Asmuth et al. .............. 379/100 |
| 4,611,098 A | 9/1986 | Giorgio et al. |
| 4,613,730 A | 9/1986 | Fechalos et al. ............. 379/217 |
| 4,618,860 A | 10/1986 | Mori |
| 4,625,081 A | 11/1986 | Lotito et al. .............. 379/88.26 |
| 4,625,276 A | 11/1986 | Benton et al. |
| 4,626,630 A | 12/1986 | Waldman ..................... 379/199 |
| 4,640,991 A | 2/1987 | Matthews et al. |
| 4,642,425 A | 2/1987 | Guinn, Jr. et al. ........... 379/199 |
| 4,644,351 A | 2/1987 | Zabarsky et al. |
| 4,645,879 A | 2/1987 | Simmons ..................... 379/355 |
| RE32,365 E | 3/1987 | Sebestyen |
| 4,649,385 A | 3/1987 | Aires et al. ................. 455/31.2 |
| 4,652,700 A | 3/1987 | Matthews et al. |
| 4,658,416 A | 4/1987 | Tanaka ........................ 379/157 |
| 4,661,972 A | 4/1987 | Kai ............................... 379/207 |
| 4,670,628 A | 6/1987 | Boratqis et al. .......... 379/88.04 |
| 4,672,660 A | 6/1987 | Curtin ..................... 379/88.19 |
| 4,674,115 A | 6/1987 | Kaleita et al. ............... 379/158 |
| 4,677,654 A | 6/1987 | Lagin et al. |
| 4,677,663 A | 6/1987 | Szlam |
| 4,680,785 A | 7/1987 | Akiyama .................... 379/56.3 |
| 4,696,028 A | 9/1987 | Morganstein et al. ..... 379/88.23 |
| 4,707,592 A | 11/1987 | Ware |
| 4,713,808 A | 12/1987 | Gaskill et al. |
| 4,736,405 A | 4/1988 | Akiyama ..................... 379/144 |
| 4,737,976 A | 4/1988 | Borth et al. ................. 379/101 |
| 4,740,788 A | 4/1988 | Konneker .................... 379/211 |
| 4,747,122 A | 5/1988 | Bhagat et al. |
| 4,748,655 A | 5/1988 | Thrower et al. ............. 455/461 |
| 4,752,951 A | 6/1988 | Konneker ................. 340/825.4 |
| 4,757,267 A | 7/1988 | Riskin |
| 4,757,525 A | 7/1988 | Matthews et al. |
| 4,761,807 A | 8/1988 | Matthews et al. |
| 4,775,999 A | 10/1988 | Williams |
| 4,783,796 A | 11/1988 | Ladd ....................... 379/88.16 |
| 4,788,718 A | 11/1988 | McNabb et al. |
| 4,802,209 A | 1/1989 | Hagsegawa |
| 4,809,321 A | 2/1989 | Mortganstein et al. |
| 4,814,763 A | 3/1989 | Nelson et al. ............ 379/88.23 |
| 4,821,308 A | 4/1989 | Hashimoto .................... 379/77 |
| 4,823,123 A | 4/1989 | Siwiak ..................... 340/311.1 |
| 4,825,193 A | 4/1989 | Siwiak et al. ............. 340/825.4 |
| 4,829,554 A | 5/1989 | Barnes et al. |
| 4,845,739 A | 7/1989 | Katz |
| 4,845,743 A | 7/1989 | Lutz |
| 4,847,890 A | 7/1989 | Solomon et al. ............. 379/157 |
| 4,860,347 A | 8/1989 | Costello ...................... 379/199 |
| 4,868,560 A | 9/1989 | Oliwa et al. ................. 455/461 |
| 4,875,038 A | 10/1989 | Siwiak et al. ............... 359/172 |
| 4,878,239 A | 10/1989 | Solomon et al. |
| 4,878,240 A | 10/1989 | Lin et al. ................. 379/88.22 |
| 4,879,743 A | 11/1989 | Burke et al. ................. 379/142 |
| 4,881,271 A | 11/1989 | Yamauchi et al. |
| 4,882,579 A | 11/1989 | Siwiak ..................... 340/825.4 |
| 4,890,317 A | 12/1989 | Hird et al. ................... 379/132 |
| 4,893,329 A | 1/1990 | O'Brien ........................ 40/436 |
| 4,893,335 A | 1/1990 | Fuller .......................... 379/200 |
| 4,896,346 A | 1/1990 | Belfield et al. |
| 4,899,373 A | 2/1990 | Lee et al. .................... 379/207 |

| | | | |
|---|---|---|---|
| 4,918,725 A | 4/1990 | Takahashi | 455/417 |
| 4,920,562 A | 4/1990 | Hird et al. | 379/88.21 |
| 4,922,490 A | 5/1990 | Blakley | |
| 4,926,462 A | 5/1990 | Ladd et al. | 379/207 |
| 4,932,042 A | 6/1990 | Baral et al. | 379/200 |
| 4,933,965 A | 6/1990 | Hird et al. | 379/93.14 |
| 4,935,956 A | 6/1990 | Hellwarth et al. | 379/112 |
| 4,935,958 A | 6/1990 | Morganstein et al. | 379/112 |
| 4,940,963 A | 7/1990 | Gutman et al. | |
| 4,941,203 A | 7/1990 | Patsiokas et al. | 340/825.4 |
| 4,942,598 A | 7/1990 | Davis | 455/31.2 |
| 4,947,421 A | 8/1990 | Toy et al. | |
| 4,953,198 A | 8/1990 | Daly et al. | 455/465 |
| 4,955,047 A | 9/1990 | Morganstein et al. | 379/372 |
| 4,989,230 A | 1/1991 | Gillig et al. | 455/552 |
| 5,007,076 A | 4/1991 | Blakley | 379/67 |
| 5,020,095 A | 5/1991 | Morganstein et al. | 379/88.24 |
| 5,023,868 A | 6/1991 | Davidson et al. | |
| 5,027,384 A | 6/1991 | Morganstein et al. | 379/88.21 |
| 5,029,196 A | 7/1991 | Morganstein | 379/88.23 |
| 5,033,079 A | 7/1991 | Catron et al. | 379/200 |
| 5,036,535 A | 7/1991 | Gechter et al. | 379/355 |
| 5,042,064 A | 8/1991 | Chung et al. | |
| 5,058,152 A | 10/1991 | Solomon et al. | |
| 5,060,255 A | 10/1991 | Brown | 379/188 |
| 5,063,588 A | 11/1991 | Patsiokas et al. | 455/517 |
| 5,077,789 A | 12/1991 | Clark, Jr. et al. | |
| 5,090,051 A | 2/1992 | Muppidi et al. | |
| 5,109,405 A | 4/1992 | Morganstein et al. | 455/410 |
| 5,128,981 A | 7/1992 | Tsukamoto et al. | 379/59 |
| 5,151,929 A | 9/1992 | Wolf | 455/31.2 |
| 5,161,181 A | 11/1992 | Zwick | 379/201 |
| 5,164,985 A | 11/1992 | Nysen et al. | |
| 5,175,758 A | 12/1992 | Levanto et al. | 455/458 |
| 5,177,780 A | 1/1993 | Kasper et al. | |
| 5,181,238 A | 1/1993 | Medamana et al. | |
| 5,193,110 A | 3/1993 | Jones et al. | 379/211 |
| 5,199,062 A | 3/1993 | Von Meister et al. | 455/461 |
| 5,206,900 A | 4/1993 | Callele | 379/201 |
| 5,206,901 A * | 4/1993 | Harlow et al. | 379/211 |
| 5,222,120 A | 6/1993 | McLeod et al. | 379/77 |
| 5,222,125 A | 6/1993 | Creswall et al. | 379/88.26 |
| 5,224,156 A | 6/1993 | Fuller et al. | |
| 5,235,633 A | 8/1993 | Dennison et al. | |
| 5,235,634 A | 8/1993 | Oliver | |
| 5,260,986 A | 11/1993 | Pershan | 379/88.17 |
| 5,263,084 A | 11/1993 | Chaput et al. | |
| 5,276,678 A | 1/1994 | Hendrickson et al. | |
| 5,276,731 A | 1/1994 | Arbel et al. | 379/100.1 |
| 5,307,399 A | 4/1994 | Dai et al. | 455/31.3 |
| 5,307,400 A | 4/1994 | Sawyer et al. | |
| 5,309,512 A | 5/1994 | Blackmon et al. | 379/210 |
| 5,311,570 A | 5/1994 | Grimes et al. | 455/31.3 |
| 5,315,636 A | 5/1994 | Patel | 455/31.2 |
| 5,315,637 A | 5/1994 | Breeden et al. | |
| 5,327,480 A | 7/1994 | Breeden et al. | |
| 5,327,486 A * | 7/1994 | Wolff et al. | 379/93.23 |
| 5,327,489 A | 7/1994 | Anderson et al. | 379/207 |
| 5,333,182 A | 7/1994 | Aoki | |
| 5,353,331 A | 10/1994 | Emery et al. | |
| 5,375,161 A * | 12/1994 | Fuller et al. | 379/57 |
| 5,384,831 A | 1/1995 | Creswell et al. | 379/88.26 |
| 5,388,149 A | 2/1995 | Lynn et al. | 340/311.1 |
| 5,394,463 A | 2/1995 | Fischell et al. | 379/201 |
| 5,408,519 A | 4/1995 | Pierce et al. | 379/211 |
| 5,410,541 A | 4/1995 | Hotto | |
| 5,450,479 A | 9/1995 | Alesio et al. | 379/88.11 |
| 5,454,032 A * | 9/1995 | Pinnard et al. | 379/167 |
| 5,469,496 A | 11/1995 | Emery et al. | |
| 5,471,519 A * | 11/1995 | Howe et al. | 379/67.1 |
| 5,515,426 A | 5/1996 | Yacenda et al. | |
| 5,525,991 A | 6/1996 | Nagura et al. | |
| 5,557,658 A * | 9/1996 | Gregorek et al. | 379/67.1 |
| 5,579,535 A | 11/1996 | Orlen et al. | |
| 5,598,458 A | 1/1997 | Bales et al. | |
| 5,608,782 A | 3/1997 | Carlsen et al. | |
| 5,610,970 A | 3/1997 | Fuller et al. | |
| 5,651,054 A * | 7/1997 | Dunn et al. | 379/67 |
| 5,652,789 A * | 7/1997 | Miner et al. | 379/201 |
| 5,661,790 A | 8/1997 | Hsu | |
| 5,673,299 A | 9/1997 | Fuller et al. | 379/57 |
| 5,680,447 A * | 10/1997 | Diamond et al. | 379/215 |
| 5,694,453 A | 12/1997 | Fuller et al. | |
| 5,703,937 A | 12/1997 | Saltzman | |
| 5,742,905 A * | 4/1998 | Pepe et al. | 455/461 |
| 5,751,760 A | 5/1998 | Fuller et al. | |
| 5,752,191 A * | 5/1998 | Fuller et al. | 455/445 |
| 5,768,356 A * | 6/1998 | McKendry et al. | 379/201 |
| 5,784,448 A | 7/1998 | Yaker | 379/215 |
| 5,805,587 A * | 9/1998 | Norris et al. | 370/352 |
| 5,809,128 A | 9/1998 | McMullin | 379/215 |
| 5,825,867 A | 10/1998 | Epler et al. | 379/215 |
| 5,838,779 A | 11/1998 | Fuller et al. | 379/211 |
| 5,841,837 A | 11/1998 | Fuller et al. | 379/57 |
| 5,842,112 A | 11/1998 | Fuller et al. | 455/31.2 |
| 5,924,016 A | 7/1999 | Fuller et al. | 455/31.1 |
| 5,963,864 A * | 10/1999 | O'Neil et al. | 455/445 |
| 6,021,176 A * | 2/2000 | Mckendry et al. | 379/35 |

FOREIGN PATENT DOCUMENTS

| | | |
|---|---|---|
| EP | 0152908 | 8/1985 |
| EP | 0216515 | 9/1985 |
| EP | 0216381 | 4/1987 |
| EP | 0046623 | 2/1989 |
| EP | 0330441 | 2/1989 |
| EP | 0 454 647 A2 | 10/1991 |
| EP | 0 462 727 A2 | 12/1991 |
| EP | 0 546 572 A2 | 6/1993 |
| EP | 0 556 575 A1 | 8/1993 |
| FR | 2541020 | 2/1983 |
| GB | 0498520 | 1/1939 |
| GB | 31 37 204 | 3/1983 |
| GB | 2173071 | 6/1988 |
| GB | 2198910 | 6/1988 |
| JP | 56-39786 | 7/1981 |
| JP | 0103564 | 9/1981 |
| JP | 59-95760 | 6/1984 |
| JP | 0041859 | 3/1985 |
| JP | 109363 | 6/1985 |
| JP | 61-80934 | 4/1986 |
| JP | 61-80937 | 4/1986 |
| JP | 0023663 | 1/1987 |
| JP | 62-118670 | 5/1987 |
| JP | 87-219740 | 9/1987 |
| JP | 62-235853 | 10/1987 |
| JP | 0084358 | 4/1988 |
| JP | 152258 | 6/1988 |
| JP | 61-88365 | 7/1994 |
| JP | 22191 | 1/2000 |
| WO | 83/04451 | 12/1983 |
| WO | 8304451 | 12/1983 |
| WO | 93/01677 | 1/1993 |
| WO | 96/09731 | 3/1996 |

OTHER PUBLICATIONS

Applied Voice Technology product reference guide for "Call Xpress 200 and 400 Series", 2/89.

Applied Voice Technology user guide for "Call Xpress", 11/89.

"SR 19000 PBX Digital Private Branch Exchange Product Reference Guide"; Solid State Systems, Inc., 11/87.

(NEC Corp.) Patent Abstracts of Japan, vol. 13, No. 435.

(NEC Corp.) Patent Abstracts of Japan, vol. 12, No. 414.

(Fujitsu Ltd.) Patent Abstracts of Japan, vol. 5, No. 70.

(Fujitsu KK) Patent Abstracts of Japan, vol. 7, No. 288.

IBM Technical Disclosure Bulletin vol. 26., No. 5, D. Zeheb "Secretarial Branch Exchange".

Direct Dialling of Credit Card Calls, Conference: 1981 International Conference on Communications, Denver, Colorado (Jun. 14–18, 1981), Chungming An & Allison Mearns.

Consumer Reports 1992 Travel Buying Guide—How to Get BIG Discounts on Airfares, Hotels, Car Rentals, and More, Ed Perkins, Consumer Reports Books, Yonkers, NY 1992.

* cited by examiner

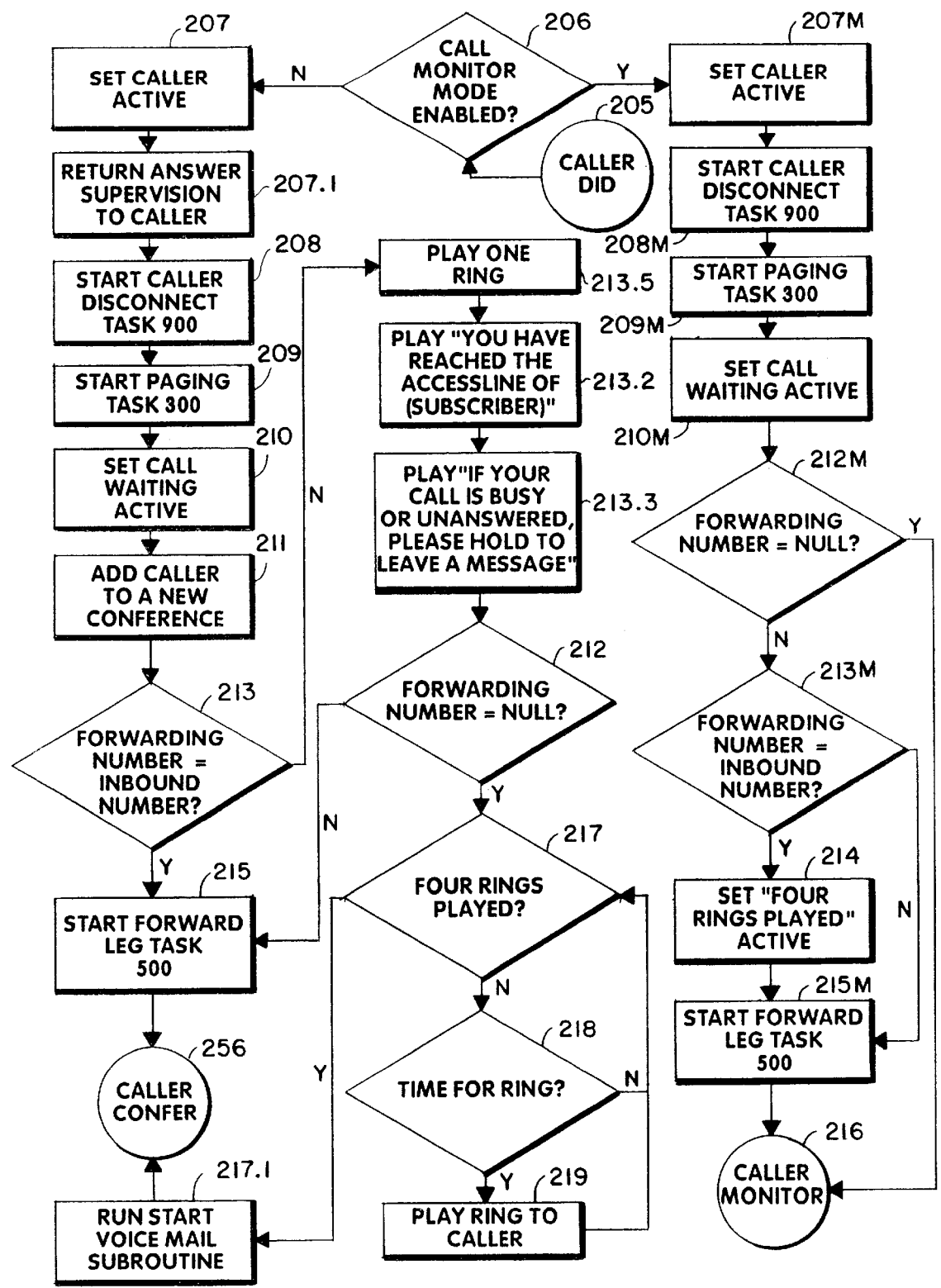
FIG. 4b(1)

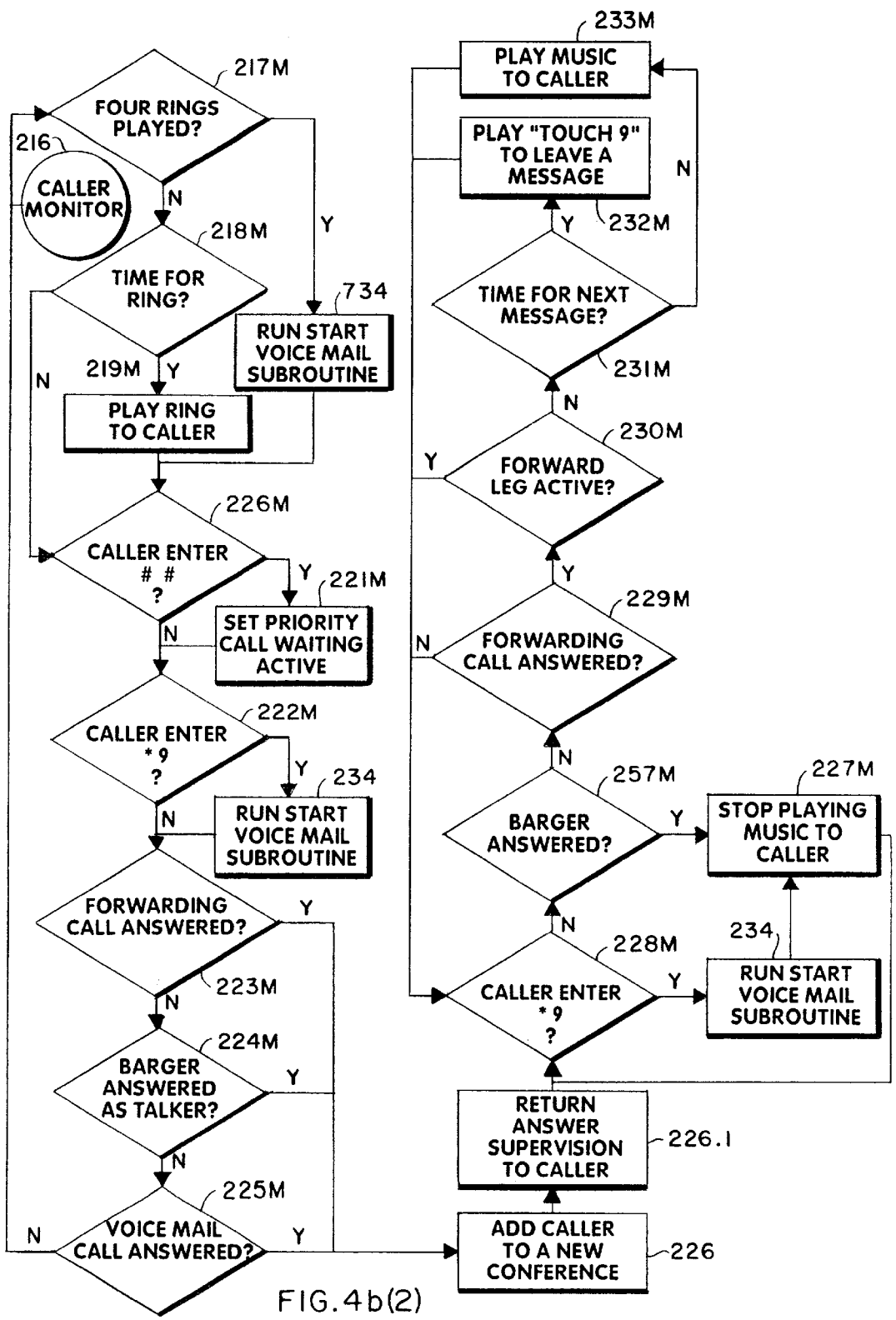
FIG.4b(2)

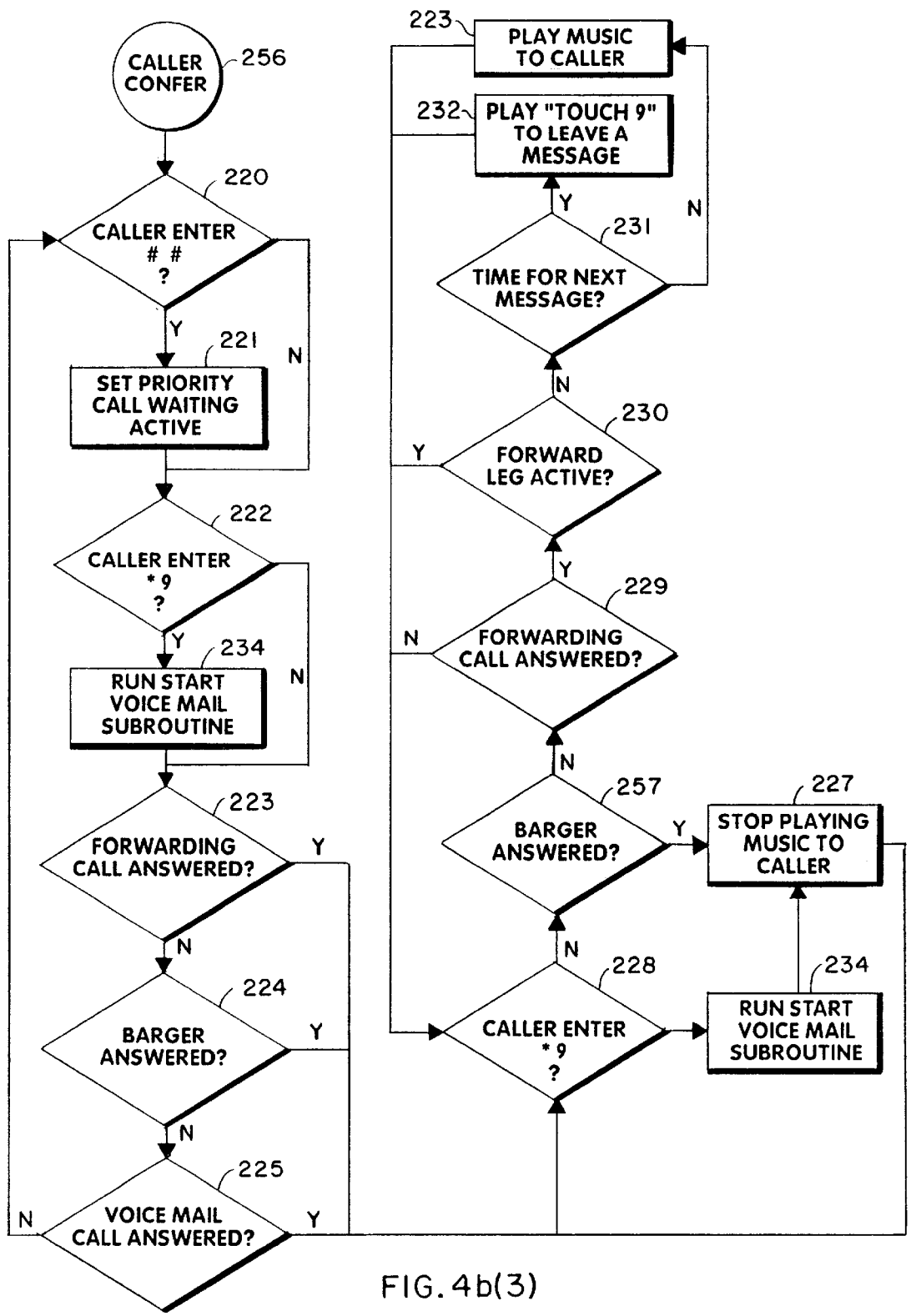
FIG. 4b(3)

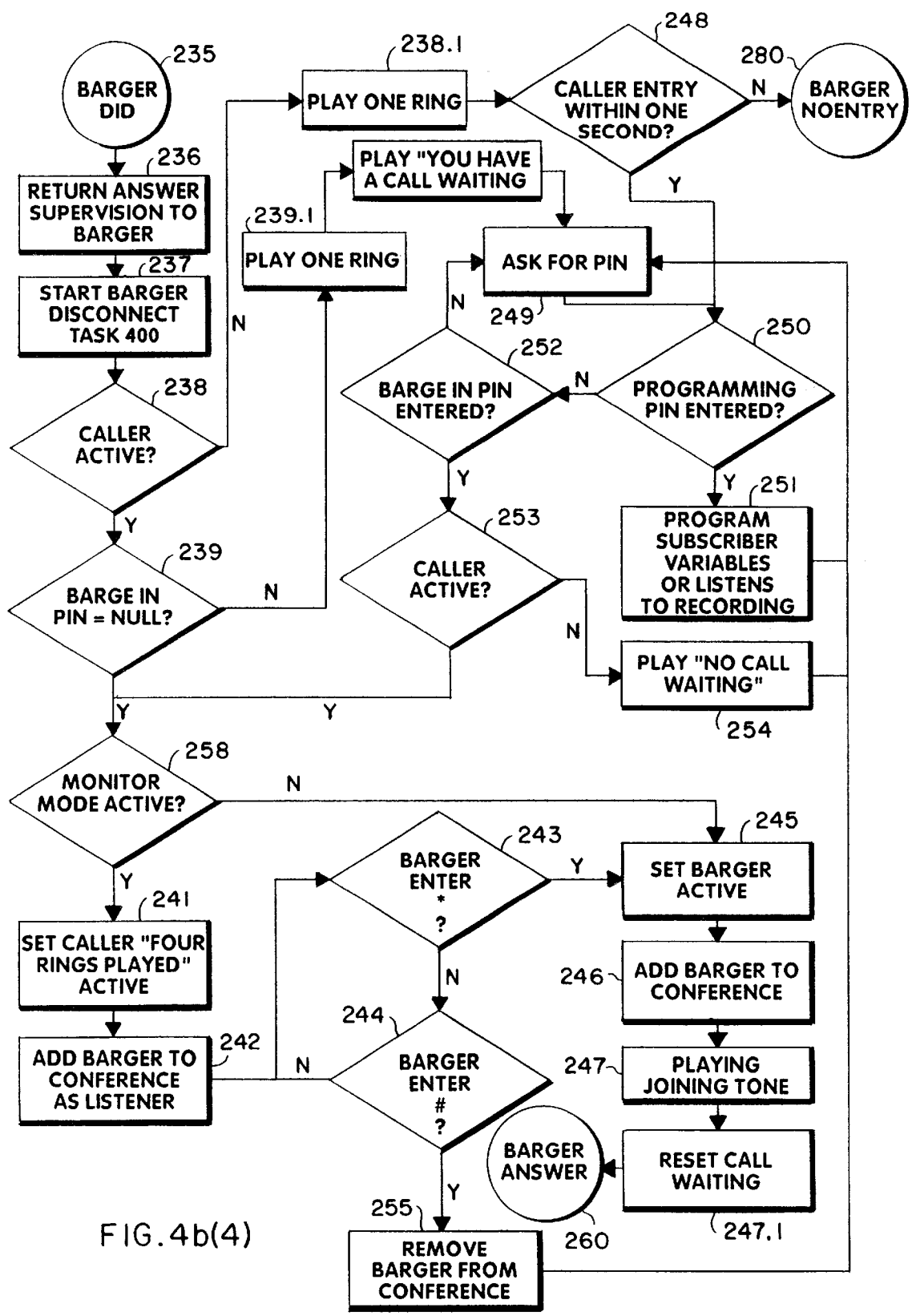
FIG.4b(4)

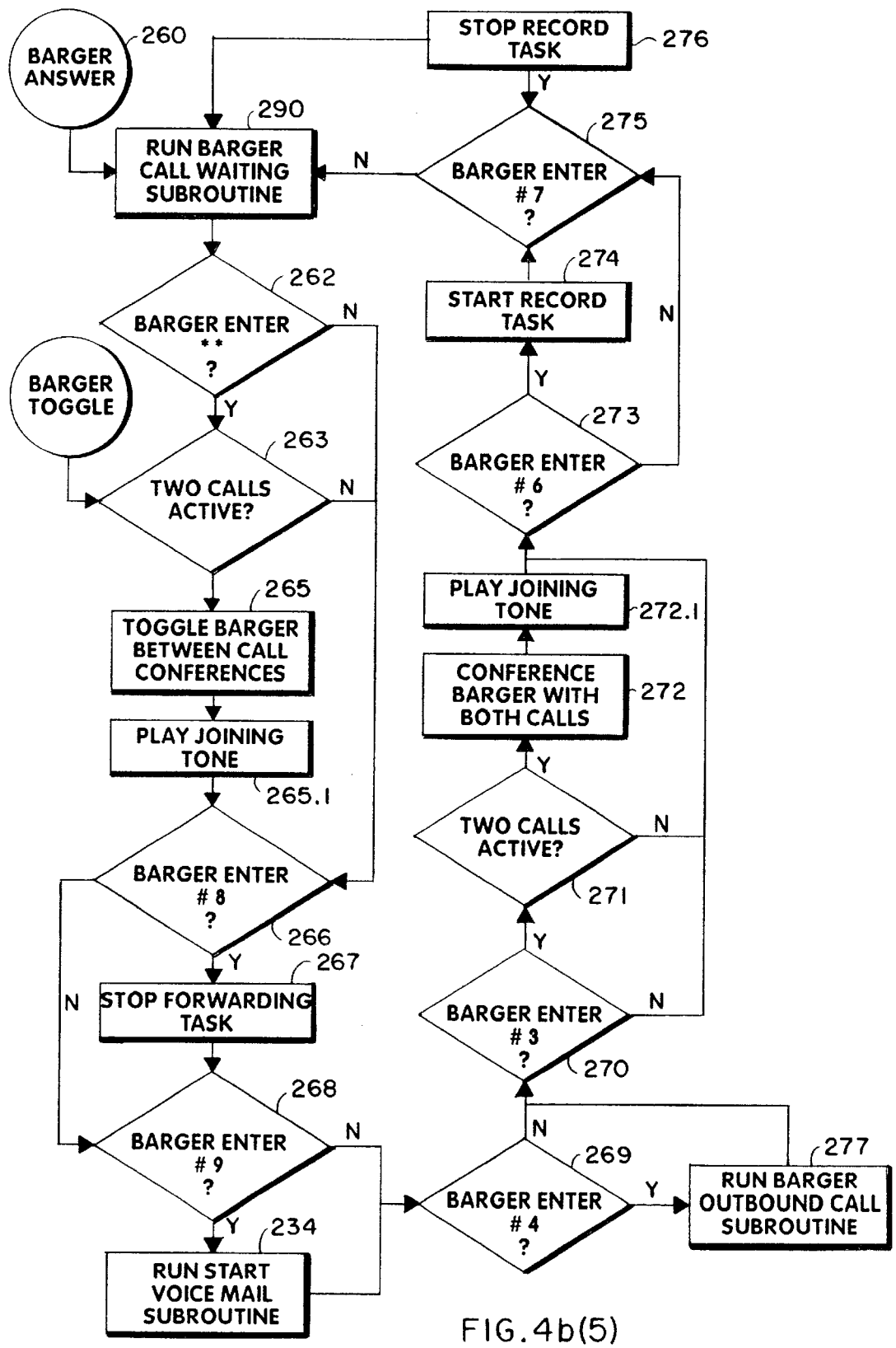
FIG.4b(5)

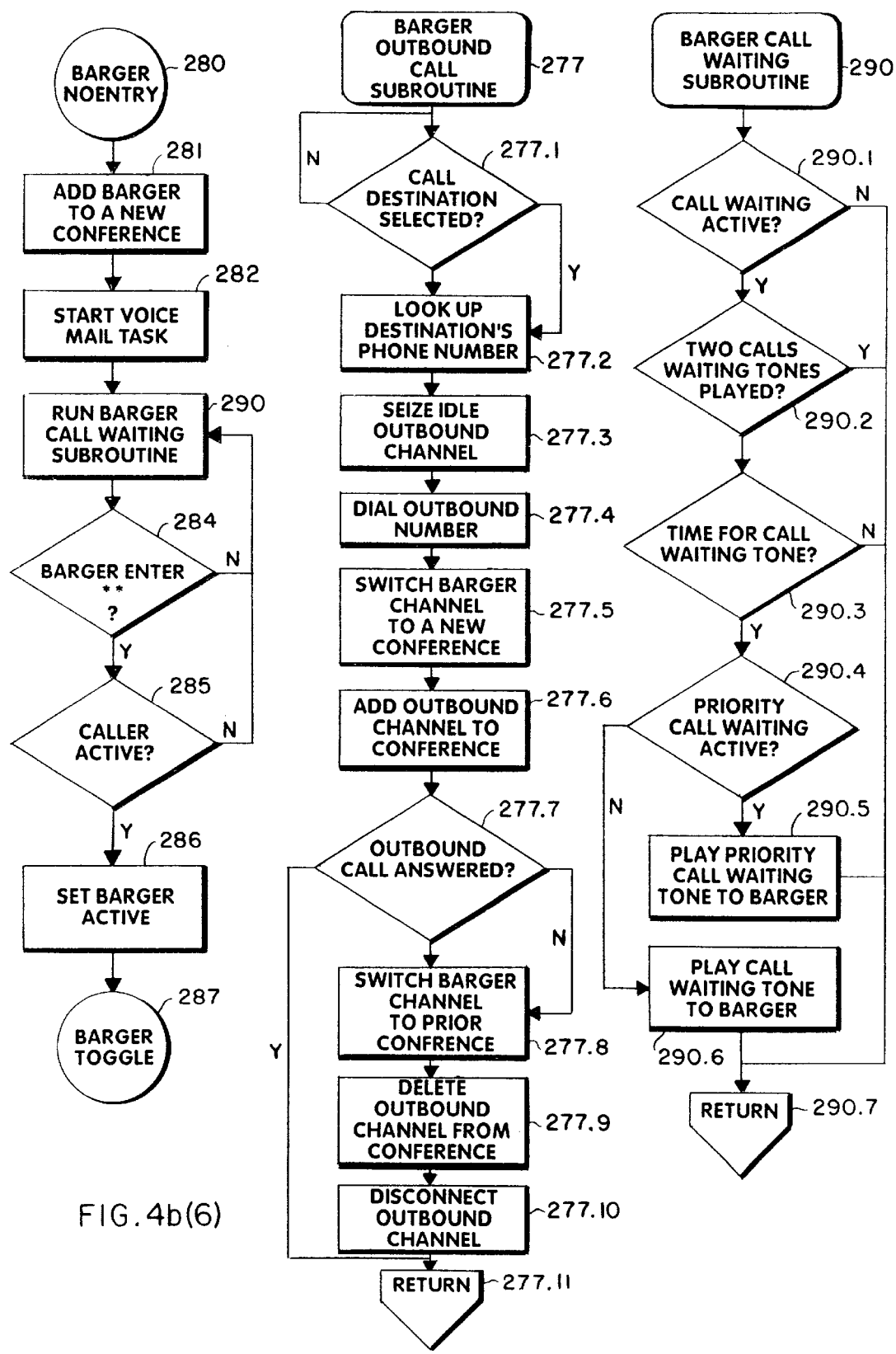
FIG.4b(6)

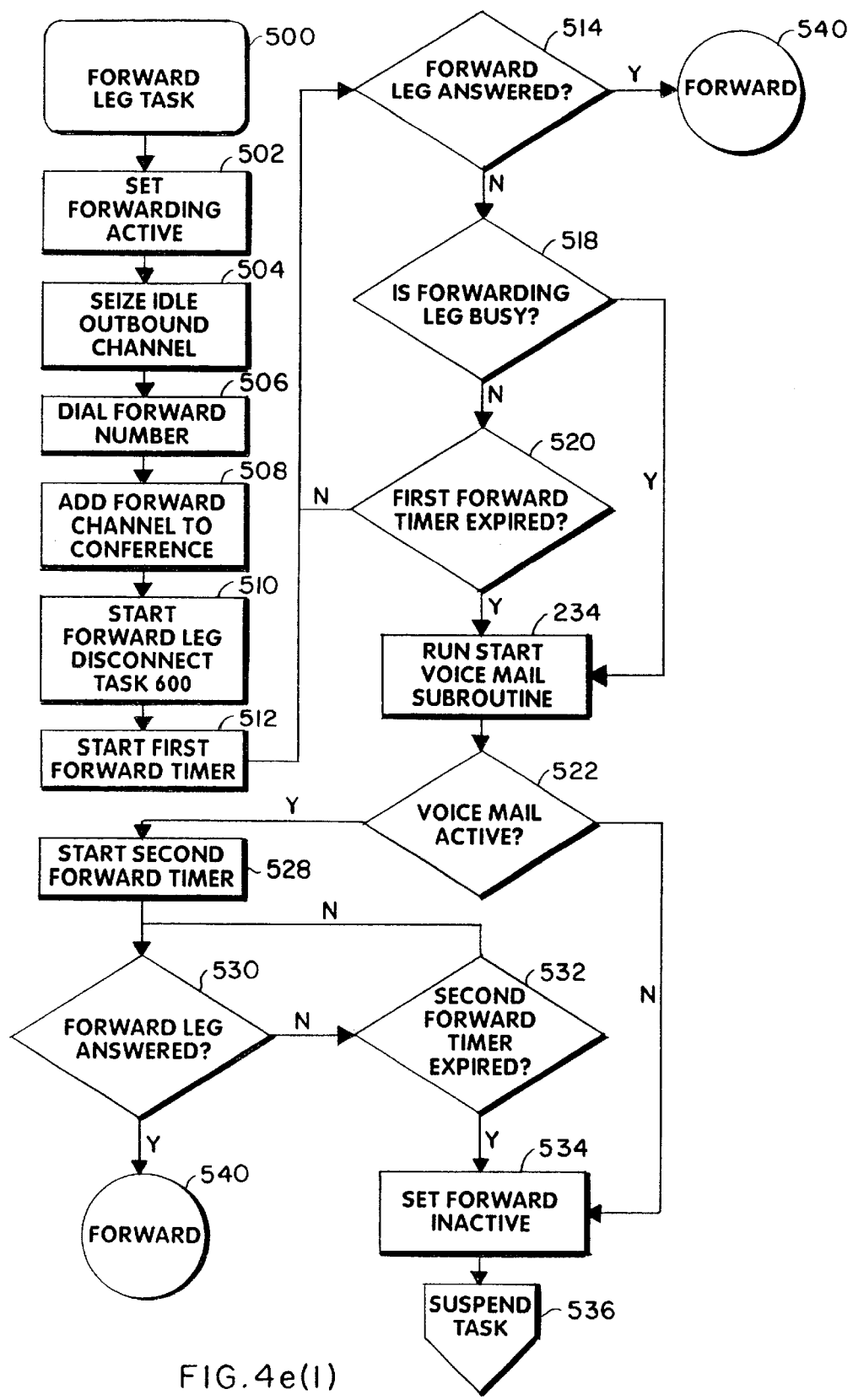
FIG. 4e(1)

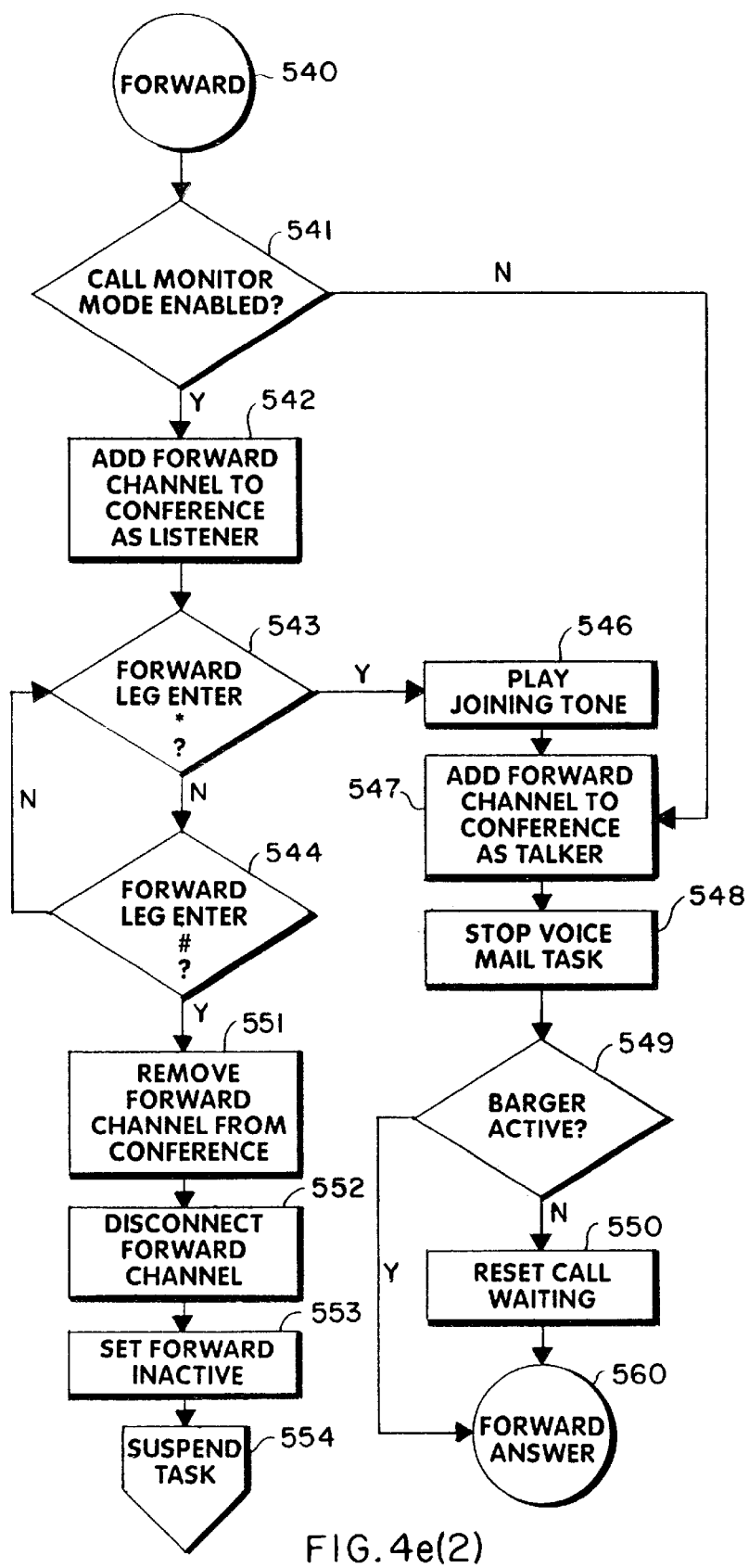
FIG. 4e(2)

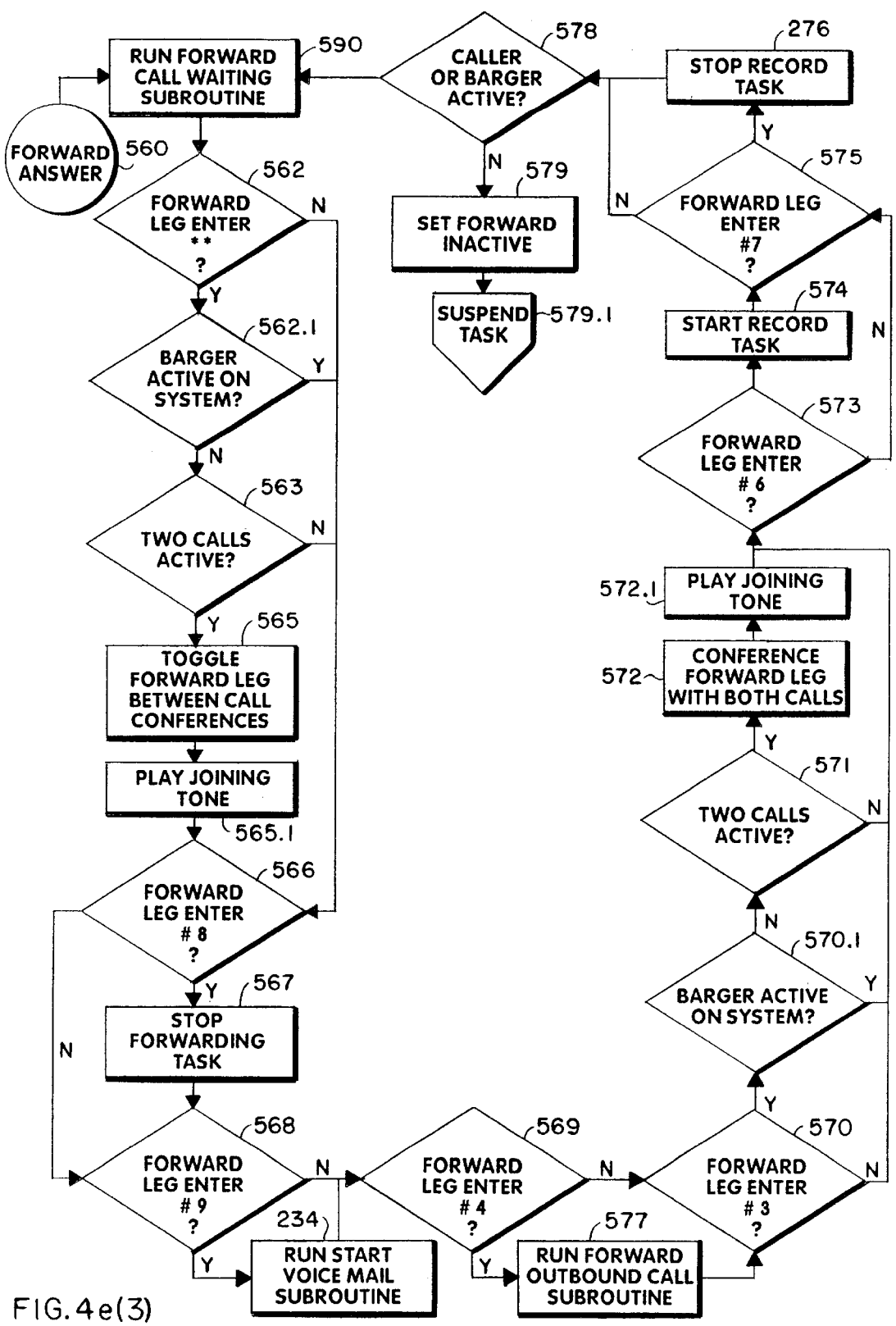
FIG. 4e(3)

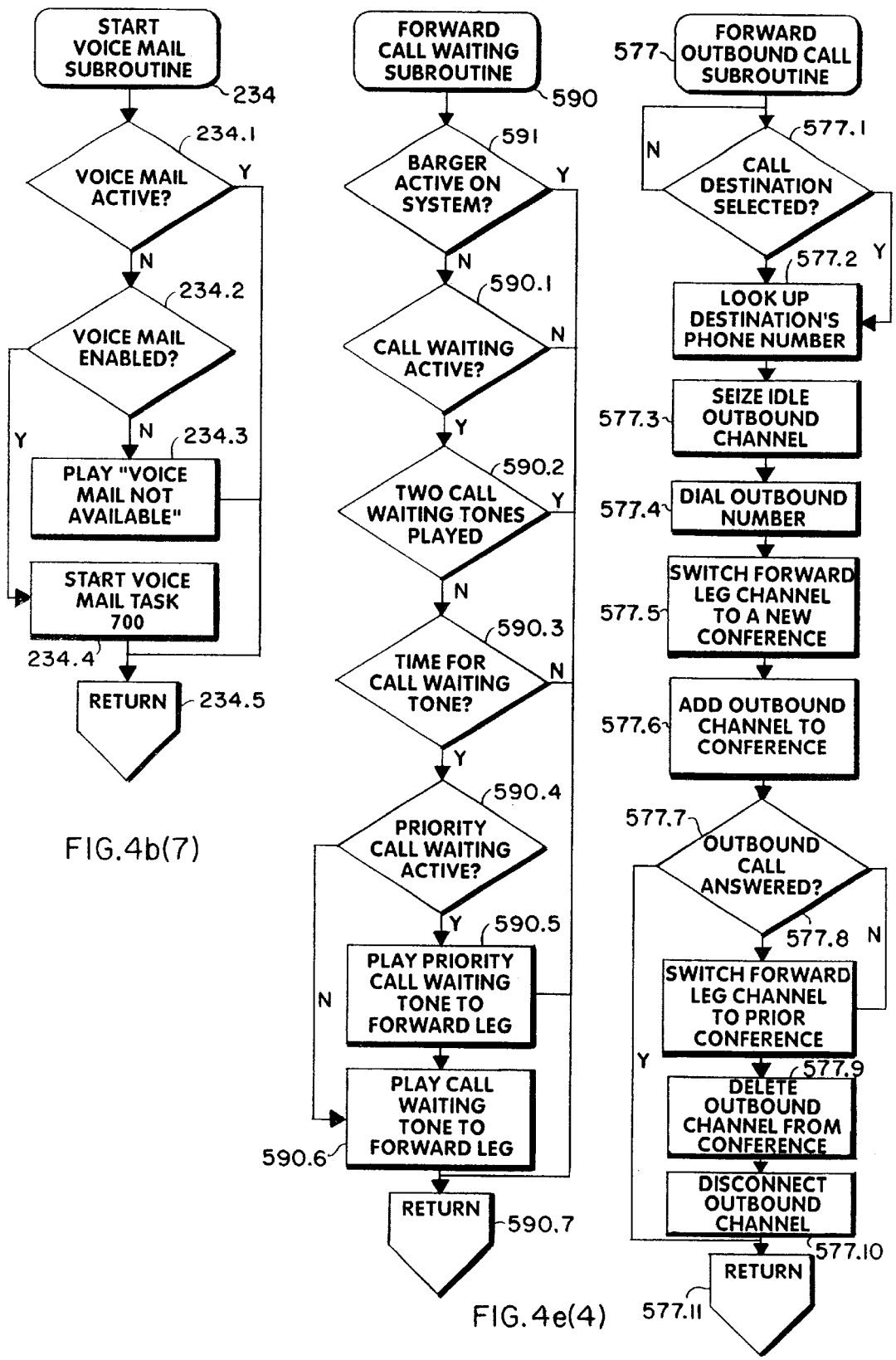

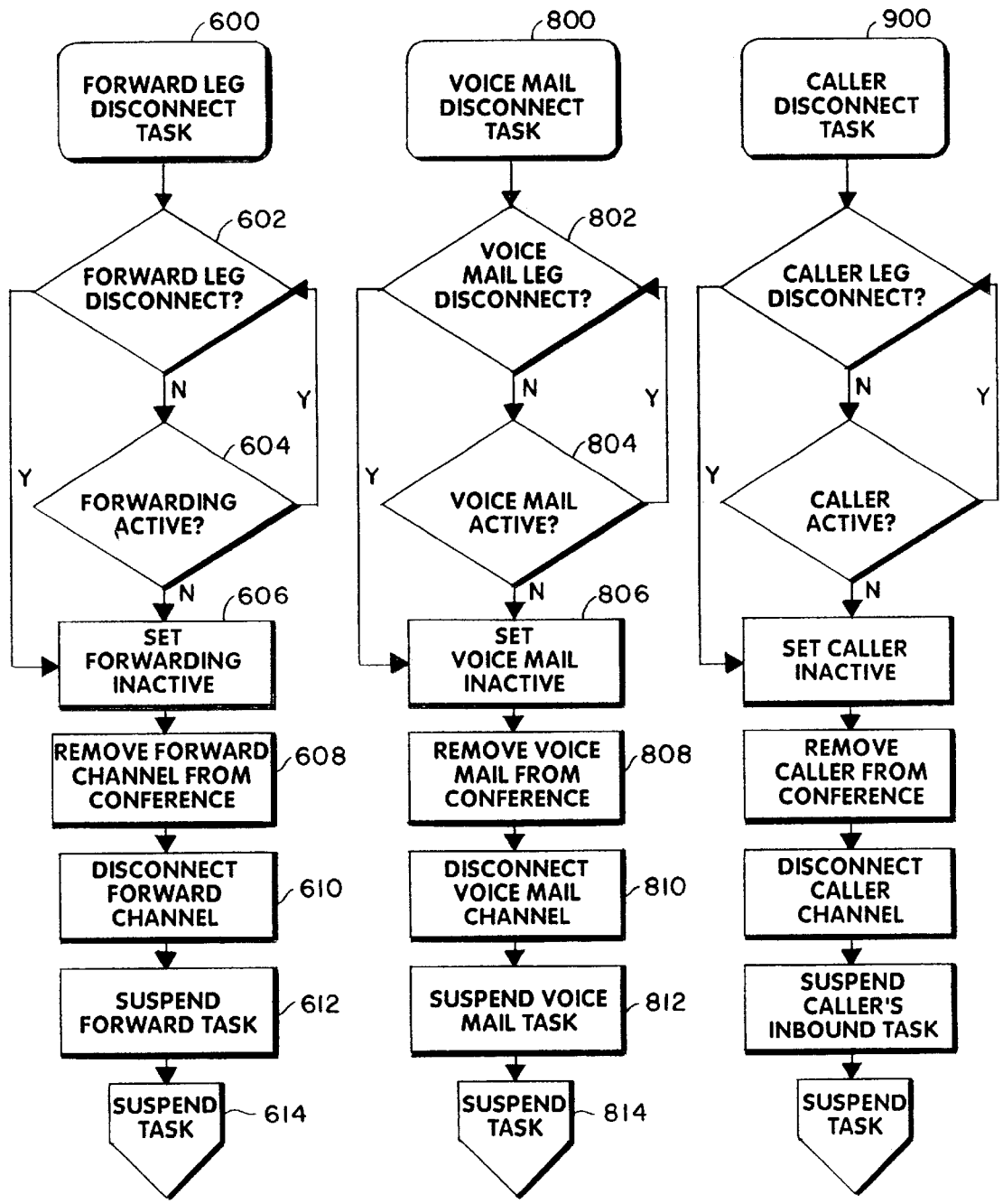

COMPUTER CONTROLLED PAGING AND TELEPHONE COMMUNICATION SYSTEM AND METHOD

CROSS REFERENCE TO RELATED APPLICATIONS

This application is related to the Intelligent Telephone Control System disclosed in U.S. patent application Ser. No. 08/354,200 of Robert M. Fuller et al as inventors and which is assigned to the applicant herein (the assignee in the United States). The aforementioned U.S. patent application Ser. No. 08/354,200 is hereby incorporated herein by reference.

MICROFICHE APPENDIX

Appendices I–X referred to herein have been included in a microfiche appendix consisting of 2 sheets and 157 frames.

1. Technical Field

The present invention relates to a computer controlled signaling and telephone communication system and method for notifying a subscriber of a telephone call placed by a caller to the subscriber.

2. Background of the Invention

Telephone systems are well known and, indeed, a number of techniques are known in the prior art to facilitate connecting a caller (i.e. the party initially placing the telephone call) with a telephone subscriber (i.e. the party whom the caller is trying to contact by telephone). Of course, a very well known way to accomplish this end is to have a telephone ring at a subscriber's presumed location.

It is well known, however, that subscribers move about during the day, and therefore, other techniques have been employed to try to place callers into telephone communication with subscribers. These other techniques include paging systems and voice mail systems. However, both paging systems and voice mail systems typically suffer a drawback in that the subscriber must receive or pick up a message either from the paging system or from a voice mail system, or some combination of the two, and thereafter, place a telephone call to the caller in order to be placed into direct telephone communication with the caller.

A problem with this approach is that it is not particularly efficient. By the time the subscriber receives the page and responds to it, the caller may have left the place from which they were telephoning or may be at an unknown location, in which case, the subscriber is frustrated in attempting to make telephone contact with the caller.

One solution to this problem, as suggested in the prior art, is to provide a "meet-me" service in which a caller is placed on hold at the same time the subscriber is paged to a telephone. The subscriber then telephones a telephone system and the system, upon recognizing the call from the subscriber, connects the subscriber with the original caller who has been placed on hold. This "meet-me" system is described. in U.S. Pat. No. 4,642,425 (to Guinn) and U.S. Pat. No. 5,151,929 (to Wolf). When the subscriber is connected to the caller this action is sometimes known as "barging in".

This prior art "meet-me" system, while improving telephone communications, still suffers certain drawbacks. For example, in a modern office, people do not necessarily stay put at their desk. They need to interface with other people in their office, and therefore, discussions may be held in offices other than their own or in conference rooms and; of course, they may leave the office to go to lunch, the bathroom or run errands. Some subscribers have a tendency to use the prior art "meet-me" system a great deal of time. While it is possible with current telephone systems to switch the "meet-me" service on and off, it does require that a subscriber input certain codes at a telephone to switch off the "meet-me" service and then key in certain codes at a telephone to turn the "meet-me" service back on. If the subscriber uses the "meet-me" system in the manner described, they are supposed to telephone the system to turn off the meet me mode whenever they arrive at the office and turn it back on whenever they leave the office. That might work well in theory, but it does not work well in practice because people forget to switch their telephone service, either when leaving the office or returning to the office; or alternatively, they will leave their telephones in the "meet-me" mode 100% of the time.

A problem which arises when a subscriber uses the "meet-me" mode is that it takes a relatively long time for a caller to make telephone contact with the subscriber, since even if they are sitting at their desk, the "meet-me" system first pages them, requiring them to pick up their telephone and input certain numbers in order to gain access to a telephone switch where they eventually meet their caller. A telephone call which might otherwise take only 15 or 20 seconds to complete, can take three or four times as long when the subscriber leaves their telephone in the "meet-me" mode.

It is, therefore, one object of the present invention to provide and improve this "meet-me" service. With the improved "meet-me" service described herein, a telephone subscriber may keep his or her telephone in a "meet-me" mode most of the time, but the system, in addition to paging the subscriber, also places a telephone call from the caller to one or more expected locations. Moreover, even if the paging feature is not utilized, it can be very advantageous to be able to try to contact the subscriber at a plurality of locations at more or less the same time automatically. For example, a telephone call placed to a subscriber can be redirected as a plurality of calls placed more or less simultaneously to the subscriber's home, car telephone and office (for example). The caller can be connected to whoever answers these calls, while the other unanswered calls continue to ring. If the paging feature is utilized, then the subscriber can respond to a page by calling into the system and be connected to the caller regardless of whether any of the plurality of calls were answered.

The present invention provides a system and a method whereby an incoming telephone call is handled by a telephone system controller. The controller is preferably a programmed device, much like a computer (in fact in the preferred embodiment it is a computer which has been adapted in certain ways to enable it to communicate with the Public Switched Telephone Network (PSTN)). The controller initiates a plurality of contemporaneous communications seeking the subscriber. This plurality of contemporaneous communications may include a plurality of independent telephone calls to different destinations or at least one such telephone call and a contemporaneous page.

Another problem which prior art telephone systems have relates to allowing the subscriber to monitor a telephone call thereby giving the subscriber the opportunity to answer an incoming call or to allow the caller to be handled by an answering machine. Indeed, modern answering machines allow the user to listen to (i.e. monitor) an incoming call in order to decide whether to answer the call immediately or to allow the answering machine to complete its task. As is well known, however, telephone subscribers are apt to receive more than one telephone call at a time, but conventional answering machines can only deal with a single call at a time (unless the cost of a second telephone line and a multi-line answering machine are borne). Several technologies have been developed to provide smoother telephone services which enable a subscriber to deal with an incoming telephone call if they happen to be on the line with another party at the time a telephone call is received. The "Call Waiting" service offered by many telephone companies allows a caller to receive a second telephone call after having answered a first telephone call. Telephone companies have also offered voice mail services to their subscribers. However, those services do not allow a subscriber to monitor an incoming call like a telephone answering machine does, but those service do have the advantage of being able to take a message from more than one caller at the same time or to take a message while the subscriber is engaged with another party on the telephone. As a result, these technologies (conventional answering machines and telephone company provided voice mail service) have competed with each other since they each provide service needs which the other cannot provide.

In addition to or complimentary to the improved "meet-me" system mentioned above, the present invention provides a voice mail system to which an incoming call may be directed. The incoming caller may be routed to the voice mail system directly or after having been processed by the system in a manner which will be described in greater detail below. The subscriber can then connect to the voice mail system in a "monitoring mode" which allows the subscriber to overhear the message being left by the calling party for the subscriber. If they wish, the subscriber may barge into the telephone call so that they may speak with the calling party, after having preferably given the calling party notice that the subscriber is barging in. The subscriber may barge in from a telephone instrument which is called by the system or after the subscriber has telephoned into the system, for example, in response to a page.

These and other features of the invention will become even more clear upon reading the following detailed description in conjunction with the attached drawings.

BRIEF DESCRIPTION OF THE DRAWINGS

FIGS. 4a–4k provide a detailed flow diagram of a preferred embodiment of the invention—the flow diagram includes a Main Task in FIG. 4a, an Inbound Task in FIGS. 4b and 4b(1)–4b(7), a Paging Task in FIG. 4c, a Barger Disconnect Task in FIG. 4d, a Forward Leg Task in FIGS. 4e(1)–4e(4), a Forward Leg Disconnect Task in FIG. 4f, a Voice Mail Task in FIG. 4g, a Voice Mail Disconnect Task in FIG. 4h, a Caller Disconnect Task in FIG. 4i, a Timer Task in FIG. 4j and a Record Task in FIG. 4k;

BRIEF DESCRIPTION OF THE APPENDICES

Appendix I is a source code listing of the Main Program written in VOS (Voice Operating System).

Appendix II is a source code listing of an Inbound Task used by the Main Program.

Appendix III is a source code listing of a Forward Task used by the Main Program.

Appendix IV is a source code listing of a Page Task used by the Main Program.

Appendix V is a source code listing of a Voice Mail Task used by the Main Program.

Appendix VI is a source code listing used by Inbound Task for phone number playback.

Appendix VII is a subroutine listing defining constants and variables used by all Tasks.

Appendix VIII is a subroutine listing defining constants used by the Dianatel hardware switch of the preferred embodiment of the present invention.

Appendix IX is a subroutine listing used for conferencing by all Tasks other than the Main Program.

Appendix X is a listing of ASCI text files which define various VOS user setup parameters.

DETAILED DESCRIPTION

Overview

Figure 1:
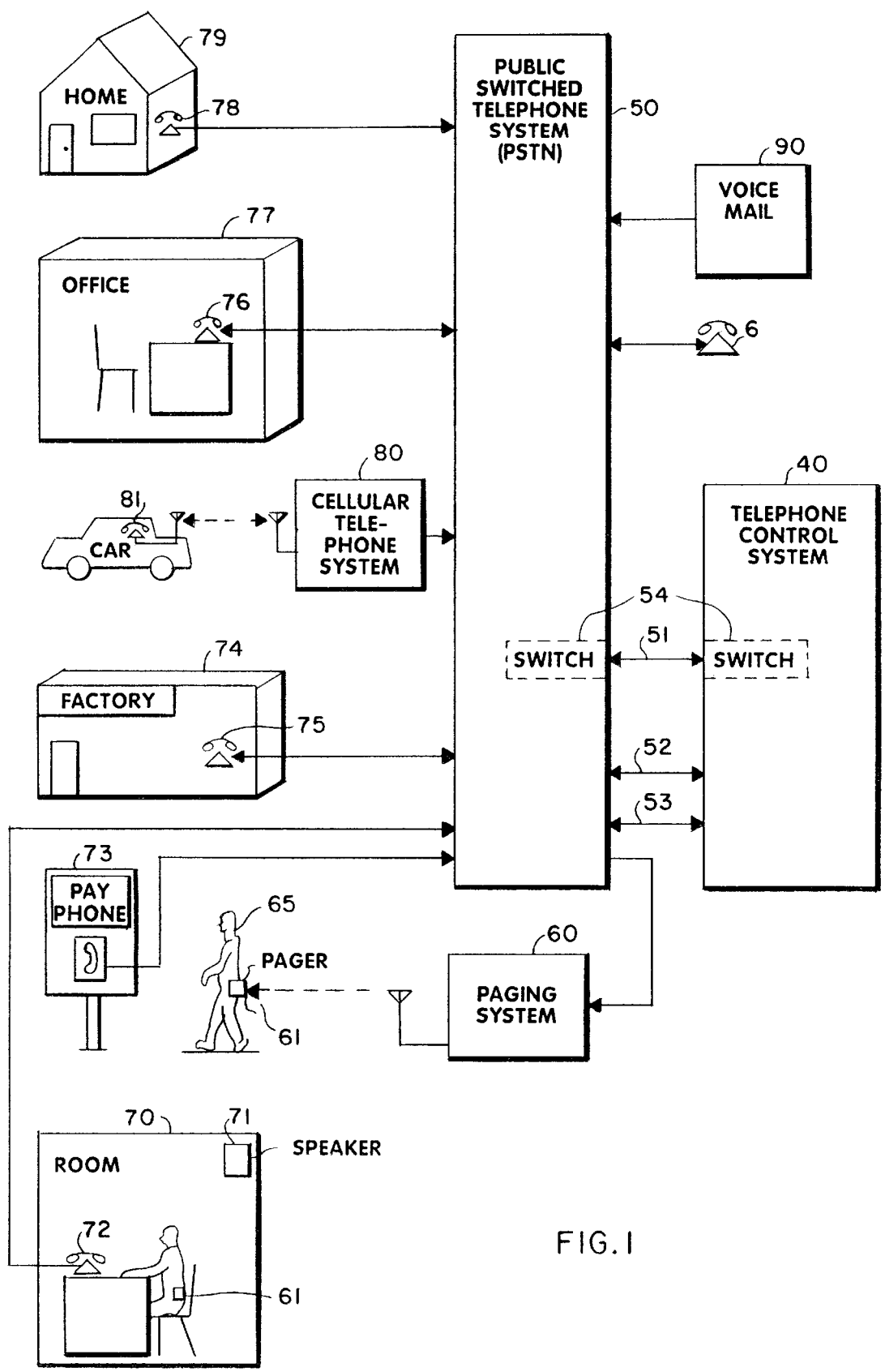
FIG. 1 is a diagram of a system of the type which may be used to embody the present invention.

FIG. 1 illustrates, in block diagram form, a Telephone Control System that may be used to enhance the accessibility of it's subscribers to callers. As is shown, the Telephone Control System 40 connects with the PSTN 50 via facilities 51. The Telephone Control System 40 may control a switch 54, causing it to connect incoming and outgoing telephone circuit, e.g., trunks or lines 51.

In an alternate embodiment, the switch 54 is actually part of the PSTN 50. In this embodiment, the facilities 51 must be capable of transmitting switch control signals from the Telephone Control System 50 to the switch 54. An example of this type of facility is a CENTREX line, which allows the transmission of switch control signals in the form of 'hookswitch flashes' and touch tones to initiate call-conferencing, call-transfer, barge-in, speed-dialing, plus all other CENTREX functions controlled by this method. A variation of the CENTREX facility is a CENTREX two-way DID trunk, which not only has the 'hookflash' capability, but also provides the called number in the form of Direct-Inward-Dialing digits. This is one form of facility 51. Another variation of the CENTREX facility provides the called number via a separate data-link known as Simplified Message Desk Interface (SMDI). Other facility type are ISDN primary rate or ISDN basic rate interfaces which provide all of these capabilities plus many other in addition to two voice compatible channels and a packet channel.

In the preferred embodiment, the switch 54 is part of the Telephone Control System 40. In this embodiment, the facilities 51 need only include standard DID trunks for the incoming calls, and standard outgoing trunks. The control system 40 controls switch 54 directly, causing it to connect paths between various incoming and outgoing trunks as required.

Again referring to FIG. 1, the Telephone Control System 40 may also connect to the PSTN 50 via standard phone lines 52, for purposes of communicating with the Paging System 60. The Paging System may be any of the commonly known paging systems such as those comprised of transmitters such as Motorola's PACE or Quintron model QT250B and paging terminals such as Glenayre model GL3000XL or BBL System 3, which send encoded messages via radio frequency to cause a unique pager, or beeper, worn by a paging system subscriber, to sound an alert, produce a message in a display, activate a light, vibrate, or produce any of a variety of other alerting mechanisms. Typically, these paging systems will cause a pager to be alerted in response to another individual dialing a phone number which corresponds to that individual's pager. This phone number may be routed via the PSTN 50 to a paging system 60 (unless the paging terminal is directly coupled to system 40), which paging system 60 in turn determines, typically via DID digits, who the call is intended for, and then sends a radio frequency message to alert that individual's pager. To cause a subscriber's pager to be activated, the Telephone Control System 40 then dials the phone number that corresponds to the subscriber's pager. Although not described in this preferred embodiment, it is anticipated that the Telephone Control System 40 could also interface to a paging system directly via a dedicated data link.

An additional facility 53 preferably connects the Telephone Control System 40 to the PSTN 50. This facility is a trunk which provides the Automatic Number Identification (ANI) of the calling party or the CLID (Calling Line IDentification) of the calling party. An example of such a trunk is the Feature Group D (FGD) trunk which is commonly used by interexchange carriers. The interexchange carriers use the ANI information to properly bill the calling party. The Telephone Control System 40 may use this ANI and/or CLID information to differentiate between calling parties and subscribers, and for other purposes described herein. Although not described in the preferred embodiment, it is anticipated that other types of facilities which provide ANI information may also be used for this purpose. An example of another type of facility which provides ANI is a CENTREX line with an SMDI data link, which is now available from several types of central offices. The SMDI data link is capable of passing both the called party number and the calling party number (ANI/CLID). In addition, ISDN primary rate and basic rate interfaces supply such information.

To aid in the discussion of the illustrative examples which follow, FIG. 1 also shows a subscriber's home 15, with a home phone 16; a subscriber's office 17, with an office phone 18; a cellular telephone system 19, which interfaces to a subscriber's car-phone 20; a factory 21, with a factory phone 22; a pay telephone 23; a subscriber 24 with pager 25; and a caller's telephone 26. A voice mail system 90 is depicted as a stand-alone system. Those skilled in the art will appreciate that the voice mail system 90 may be embodied in telephone control system 40 instead, or elsewhere in the overall system.

The illustrative examples which follow are intended only to clarify some of the concepts, features, and objects of the invention, and do not define the scope of the invention. In this embodiment, the apparatus and method of the invention control switch 41 which may be located, for, example, in the central office of a telephone company. Alternatively, and preferably, a controlled switch 41 is included with the apparatus of the present invention, which, in turn, may be located either on the premises of the telephone company switch or elsewhere, including the premises of a business which make use of the system. In another embodiment the invention is embodied in a telephone control system 40 which may be placed upstream of a private branch exchange (PBX) having direct inward dialing (DID) capabilities.

Before describing the preferred embodiment in detail, a general overview of how the invention may be practiced is first described with reference to the flow diagram of FIG. 2. This flow diagram is straight forward and is intended to give an overview of how the system handles telephone calls. A more robust flow diagram is set forth in FIGS. 4a–4k which shows how the preferred embodiment of the system would function in a multitasking environment.

Figure 2:
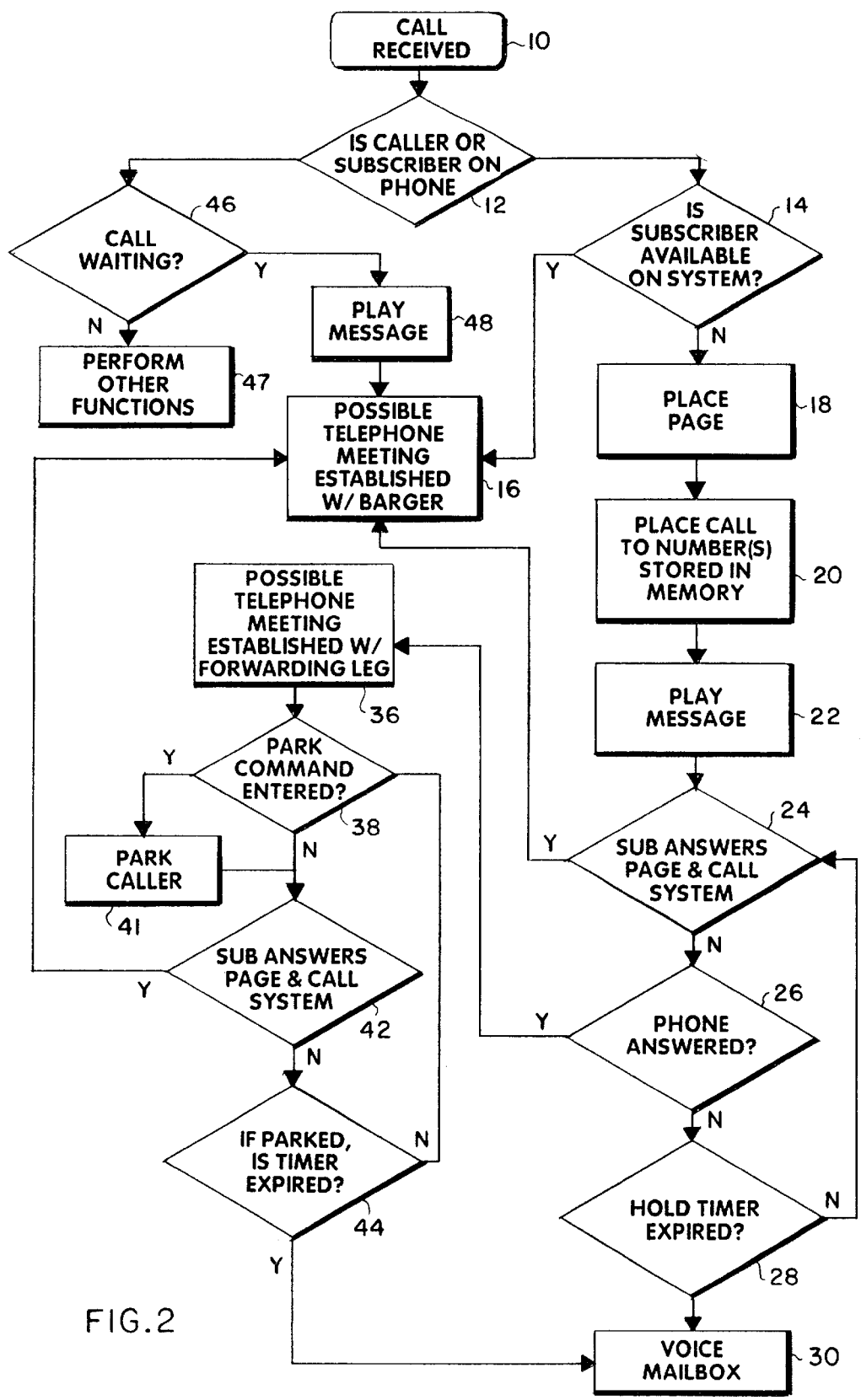
FIG. 2 is a flow diagram showing the processing capabilities of the call processing facility of the system of FIG. 1.

Referring to FIG. 2, a call is received at block 10 and a decision is made at step 12 as to whether or not the person placing the call is a subscriber of the system or is a caller who is trying to reach a subscriber 65 (FIG. 1). The location of the subscriber may be unknown. The subscriber may be at home 79, at the office 77, in their automobile or elsewhere. The telephone control system will attempt to use telephone system resources to place the subscriber in telephone contact with a caller located at a phone 6.

Callers and subscribers can be differentiated in a number of ways. Thus the decision at step 12 can be made by various means, including (i) examining the Calling Line I.D. (CLID) of the party placing the call to determine if the caller is a known subscriber and/or (ii) examining the Direct Inward Dial (DID) digits received from the Public Switched Telephone Network (PSTN) 50 (this embodiment assumes that the subscriber has one telephone number which he or she uses to contact the system and a different telephone number which callers use to contact the subscriber) and/or (iii) whether a special code (i.e. a personal identification code or PIN) is input by the person placing and/or receiving the call to identify themselves as a subscriber. Since the CLID is not always available and since forcing the subscriber to use a PIN makes the marketing of a telephone service more difficult, the currently preferred manner of dealing with this problem is technique (ii) mentioned above, namely, one telephone number is dedicated to each subscriber for the subscriber to use when calling the system to pick up messages or, in the context of the present invention, to meet a calling party who has called the system trying to contact them, and a second telephone number is dedicated to each subscriber for callers to use when calling the subscriber via the system. In any event, it is contemplated that incoming calls can be differentiated between subscribers of the system and callers (who are trying to contact subscribers).

Assuming that a caller is on the line trying to reach a subscriber, a test is preferably made at step 14 to determine whether or not the subscriber is already available on the system. Whether or not this particular test is made at this stage, depends in part, on whether or not the particular hardware which is utilized will support the making of such a test and whether the additional complexity of including this test is deemed to be worthwhile. It is believed that this test should preferably be performed. If the subscriber is already available on the system at the time the caller calls, the processing branches to block 16 where a telephone connection is established between the caller and the subscriber. The subscriber may already be on the system if, for example, the system includes a voice mail system and therefore the subscriber may already be on the system at the time the caller calls for the purpose of picking up his or her voice mail messages. Alternatively the subscriber may be engaged in a conversation with another caller. In that case, when the new caller reaches the system, call waiting treatment is preferably applied to the subscriber's circuit.

At block 16, when a telephone meeting is established, that means that a connection is made between the subscriber who has dialed the system on one line with a caller who has also dialed the system on a different telephone line. However, the connection can be either a full duplex connection (in which case both parties can speak with each other) or it can only be a half duplex connection (in which case the subscriber can listen to what the caller says, but cannot speak with the caller). This half duplex mode is used if the subscriber wishes to monitor the call before making a decision to speak with the calling party. Typically, the calling party might be conveyed to a voice mail system where the subscriber can "eavesdrop" on the message which the calling party is leaving for the subscriber. Then, if desired, the subscriber can signal the system to switch to full duplex communication after the system has preferably first advised the calling party that the subscriber is entering the conversation. The voice mail system 90 is preferably set up to pause when the subscriber barges in, so that recording then stops. However, the voice mail system 90 may also be designed to allow it to monitor for a code which would cause is to resume recording. This would be convenient for the parties if they had some particularly good ideas which they would like to record and conventional note-taking pads are either unavailable or inconvenient to use (such as when driving an automobile).

If the subscriber is not available at step 14, or if that test is not made, the call processing falls through to block 18 where a page is placed to the subscriber. The page may be via a conventional radio communication paging system 60 to a device 61 which signals the subscriber by making beeping sounds, or vibrating, or otherwise signaling the subscriber that they are being paged. Alternatively, the page may be by other means, including a computer generated audible voice page delivered in a suite of offices or rooms 70 by means of speakers 71 advising a party that they have a call. Such a page can be delivered directly to speakers built into many telephones and a subscriber, after being so paged, can go directly to the nearest telephone, call the system (if needed), enter a PIN code and be connected to the calling party. Some means of signaling the subscriber that they have a call is provided, so that they know to access the system and make a connection with the caller.

More or less simultaneously, the system also places a call to a telephone where the subscriber 65 is expected to be located, for example, to phone 76 at office 77 or a phone 72 in a room 70 in a building. This call may be placed via a PBX to a telephone in the subscriber's office or may be placed via the PSTN 50 directly to a telephone 76 on the subscriber's desk, or to another telephone where the subscriber is expected to be located, for example, phone 81 in the subscriber's automobile, phone 78 at the subscriber's home 79, phone 75 at factory 74, or to a phone on their person, or wherever the system expects to locate the subscriber. The telephone number of the subscriber's expected location(s) is (are) stored in a memory in the control system 40 and indeed, may be based upon a schedule which tracks the normal movements of the subscriber throughout the day. The schedule may include a "Do Not Disturb" mode in which they would not be paged nor would the system try to contact them directly, but rather, the caller would be connected directly to a voice mail box 30 of the subscriber. As will be discussed with reference to the preferred embodiment, the system can also make more than one call seeking the subscriber and/or to connect the calling party with the voice mail system 90. Such calls can be made simultaneously or sequentially. In the preferred embodiment, the voice mail system is available at a telephone number which is contacted either sequentially, that is, after the other forward leg call(s) are made or concurrently, if the subscriber wants to be able to monitor the incoming call (in which case the incoming call is preferably to be directed to voice mail so that the subscriber can listen to the caller's voice). Alternatively to contacting a voice mail system, the telephone number of the subscriber's secretary, for example, may be stored in the system so that when the system fails in making a connection with the subscriber within a predetermined time period, the inbound call then would be directed to the subscriber's secretary (for example) instead of to voice mail.

In addition to placing the page and placing the telephone call, the caller is preferably informed that normal call processing is occurring. This may be done by (i) allowing the caller to listen to the sounds generated by the PSTN (or local PBX) while the call is being placed to where the subscriber is expected to be located, or (ii) simulating telephone ringback sounds, or (iii) generating a voice indicating to the caller that the caller has reached the telephone line of the subscriber and the subscriber is being paged to a telephone, or (iv) allowing the caller to interact with the voice mail system 90 if the subscriber wants either to be able to monitor the call or wishes not to be disturbed, or (v) playing music, or any combination of the forgoing, starting at step 22. Typically a timer would also be set for the subscriber to either answer their phone or to answer their page and telephone the system, but that timer is not needed if the caller is sent directly to voice mail.

A test is made at step 24 to determine whether or not the subscriber has answered the page and telephoned the system. The subscriber may use any telephone interconnected to the system to respond to the page, including a pay telephone 72 on the street. If the subscriber has answered the page and telephoned the system, a branch is made to block 16 for which the processing has been previously described. Otherwise, the processing falls through to another test at step 26 to determine whether or not the telephone number(s), which was (were) called at step 20, has (have) been answered (the voice mail number need not necessarily be tested for this purpose—the purpose here is to see if a human has answered the phone, and, if so, to give the human certain options). If desired, a message may be played for the answeree, advising them that the subscriber has an incoming call, and thus giving the answeree the opportunity to receive the call, reject the call, monitor the call or transfer the incoming call to another network address. At this point the processing preferably falls through to step 36. The two steps discussed above, namely advising the answeree of the call and allowing them to reject it, may not be embodied at all or only partially or may be disabled by suitable programming so that these additional steps might be utilized in some situations and not in others. For example, if the call placed at step 20 is directed to the subscriber's telephone at their desk, such additional steps may not be warranted. On the other hand, when the telephone number which is called at step 20 is a telephone number which is not necessarily primarily and exclusively associated with the subscriber, such as a home telephone number, such additional steps might be included so that the answeree is advised that an incoming call is for the subscriber, giving them the opportunity to accept or reject the call. The timer examines how long the caller has been waiting for the subscriber to either answer a phone or to answer the page, and if the subscriber does not respond within a reasonable period of time, the processing falls through at step 28 so that the caller is then conveyed to a voice mailbox, at block 30, where they would be invited to leave a message for the subscriber. Of course, this step is unnecessary if the calling party has already been conveyed to voice mail to give the subscriber an opportunity to monitor the call.

Turning now to Box 36, a telephone call has been placed at step 20, and if the telephone call has been answered, the caller is connected to the person who answered the telephone at step 36. This connection may be a full duplex connection or a half duplex connection depending on how the system is programmed for that particular subscriber.

The person answering the telephone can park the call at step 38, assuming they enter the telephone call if the system is set up to allow the party on the forward leg to monitor an incoming call. This park feature is useful because the person answering the telephone may tell the caller that the subscriber will be with them in a few moments and then place the call on park at step 41. As will be seen, in the embodiment disclosed with reference to FIGS. 4a–4k, the call can be parked merely by placing the answered phone on hook. At step 42, a test is made to determine if the subscriber has answered the page by phoning into the system. If so, a branch is made to block 16 where the subscriber is placed into telephone communication with the caller, either in full duplex mode or in half duplex mode, as previously discussed. The party on the forwarded leg is preferably also allowed into the communication with the subscriber and calling party and the subscriber is preferably provided with a mechanism to disengage the party (parties) on the forward leg (legs), if desired. If the subscriber has not yet telephoned the system, the processing falls through to step 44 where, if the call has been parked, a determination is made to see if a park timer has expired. If the caller has been parked for more than a predetermined amount of time, as indicated by the timer, the processing will fall through step 44, and the caller is directed to the subscriber's voice mail at block 30 where the caller can leave a voice mail message for the subscriber. Of course, this could be a second trip to voice mail. For example, if the forward leg calls placed at step 20 are set up in monitoring mode, then the calling party is connected to voice mail at that time and voice mail is paused once the answeree on the forward leg barges into the call. If the answeree exchanges some pleasantries with the calling party and then parks them in anticipation that the subscriber will answer on another forward leg or will telephone the system in response to the page, the timer may expire sending the calling party back to voice mail. Alternatively, the calling party may be advised that they have the opportunity of transferring to voice mail if they tire of waiting for the subscriber, in which case a transfer to voice mail occurs in response to a command entered by the calling party. If the voice mail system has simply been paused, then it would be preferable to restart the voice mail recording process previously initiated as opposed to starting a new voice mail session.

When the subscriber answers the page by telephoning the system, and the call made at step 20 has also been answered, then a three way conference ensues. An appropriate warning tone or message can be played so that the persons in telephone communication realize that the subscriber is barging into the telephone call. Preferably, the subscriber is provided with a means of disconnecting the party who answered the call on the forward leg to ensure privacy.

It is to be noted that a test is made at both steps 24 and 42 as to whether or not the subscriber has answered the page and telephoned the system. Preferably, that testing would occur throughout the processing described above, and not simply at the places indicated. A more robust version of this system will be described with reference to FIGS. 4a–4k, which employs multitasking so that multiple processes can be performed simultaneously.

Turning now to an incoming call being detected from a subscriber, a test is made at step 46 to determine whether or not a call is waiting, i.e., whether there is a caller waiting to be connected to the subscriber. If so, the subscriber may be advised that they have a call waiting by an appropriate message played before the connection is made at step 16. They may also be given the choice of entering the connection in monitoring mode (i.e., in half duplex mode) or entering the connection in full duplex mode) The subscriber may also be advised, at this step, when an additional party enters the connection in full duplex mode, such as the party answering a phone call made at step 20 chooses to connect in full duplex mode.

Of course, the test made at step 46 need not be accomplished if the call meeting process described above is the only process which is performed by the system. Otherwise, when a subscriber calls into the system, and they have no call waiting, the processing falls through to block 50 where other functions may be performed, such as programming the system (for example to change the mode of operation, to change forwarding numbers, to change a schedule, etc.) or to give access to the subscriber's voice mailbox, etc. The call waiting test made at step 46 would preferably be done on a pre-emptive basis so that even if the caller were in their voice mailbox and if a call were to come into the system from a caller, the subscriber's presence on the system would be detected at step 14 and the subscriber would be advised that they have call waiting. The subscriber and the caller can then be conveyed to a telephone meeting at block 16. Preferably, the subscriber would be first given the opportunity of meeting the call or conveying the incoming call directly to voice mail at block 30 in the event the subscriber wishes to continue his or her activities at block 47.

The foregoing description has been in the context of implementing the invention in a telephone control system 40 of the type depicted in FIG. 1.

Figure 3:
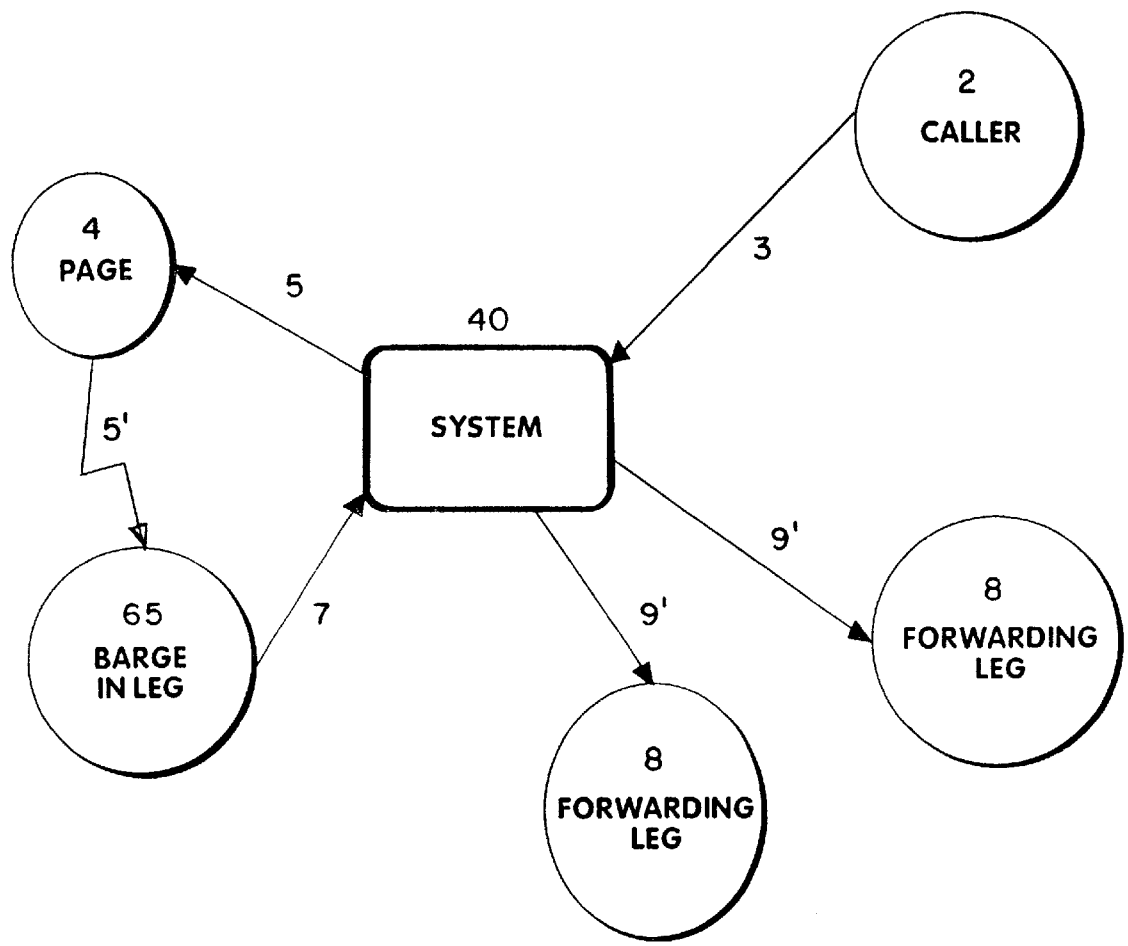
FIG. 3 shows how the system interacts with callers, subscribers and other persons.

Turning to FIG. 3, this figure shows the system 40 in which the present invention may be implemented and how it interacts with callers, subscribers and other persons. A call is initiated by a caller 2 who places a telephone call, designated by line 3, to system 40. The system responds by (1) paging the subscriber and (2) attempting to telephone the subscriber. Here the paging system is shown at numeral 4 and it is connected to system 40 by a communication facility 5 (which may be provided by the PSTN or by a dedicated channel). The paging system 4 transmits a paging signal 5' to the subscriber who carries a paging device on his or her person. The subscriber may telephone the system 40 from any telephone 6 interconnected to the system to barge into the call with the caller 2. This connection is called the barge in leg and is designated by the numeral 7. This leg of the call would typically be made via the PSTN. The system in addition to causing a page to occur also tries to contact the subscriber at a telephone 8 having a predefined telephone number. This connection is called a forwarding leg 9 and it may be made via a PBX with which the system 40 cooperates or via the PSTN. The system may initiate more than one forwarding leg (as is represented here by telephone 8' and forwarding leg 9') if it is desired to ring more than one telephone simultaneously with the placing of the page. For example, the system may be programmed to place forwarding leg calls to the subscriber desk telephone and to their car telephone during normal working hours whenever an incoming call arrives in the system 40 from a caller 2 for the subscriber, in addition to placing a page to the subscriber. Once the subscriber is placed in telephone contact with the caller any unused legs may be then torn down or they may timeout of their own accord. When multiple forward leg calls are initiated, the system preferably produces simulated ring back tones or other call progress signals in lieu of providing multiple PSTN call processing sounds which may be confusing to the caller (for example, if two forward legs calls were placed and one number was busy while the other number was ringing, the sounds produced by the PSTN would be rather confusing—to say the least—and the calling party should preferably be isolated from those sounds).

If more than one forward leg call is initiated, ringing continues on each forward leg until the associated telephone is answered. Thus if forward leg calls are made to a subscriber's cellular phone and to their office phone simultaneously, the cellular phone continues to ring even if the office phone is answered. Likewise, the office phone continues to ring even if the cellular phone is answered. Of course, the system can be modified so that one phone stops ringing when other is answered. As a further modification, the determination of whether one phone stops ringing when another is answered could be made programmable and perhaps even a function of which phone answers first. Thus, in the foregoing example it might be desirable to have the office phone stop ringing if the cellular phone is answered, but not the other way around (i.e., the cellular phone would continue to ring irrespective of whether or not the office phone is answered).

In the foregoing example, if the office phone is answered, the cellular phone continues to ring. And it continues to ring even if the office phone is hung up. Thus a person in the subscriber's office can speak with the caller and tell them to hold on—the subscriber should be with them in a moment. When the subscriber eventually answers the cellular phone (or answers a page, if they are using a pager), they can speak with the caller who has effectively been placed on hold merely by the action of the person in the subscriber's office hanging up.

A more detailed embodiment of the invention is now described with reference to FIGS. 4a–4k. The invention, as described with reference to these figures, can be implemented in the computerized switch of a telephone switching office or can be implemented in an adjunct computer which controls the switch 41 in a telephone switching office or can be implemented in a telephone control system 40 which is attached to or part of a PBX, for example, in a business. As will be seen, the invention as disclosed in this embodiment has many of the same features as the invention disclosed with reference to FIG. 2, but it has several additional features. For example, methods for handling long distance or toll calls are established so that the caller is not charged for a toll call until such time as the caller's telephone call is answered either by the subscriber or by another person who picks up the telephone 8 or 8' on the forwarding leg. Of course, that is the typical way in which toll calls are charged. In the invention as disclosed with respect to FIG. 2, when a telephone call is received at step 10, answer supervision might then go back to the telephone company. Answer supervision not only tells the telephone company to start charging for the call but some long distance companies typically disable the voice channel from the caller until answer supervision is returned. The forward channel may be desired in some embodiments, since if no one answers the call, the caller may want to select voice mail, and the system would then need to hear the keys depressed by the caller in order to make that selection. Typically there is no need to enable the forward voice channel from the caller 2 until they are placed in contact with (i) the subscriber, (ii) a party who answered the forwarding leg call, or (iii) the voice mail system (so that the caller can leave a message and so that the subscriber can monitor the call if they so desire). Thus, if the call at that step 10 were a long distance call, a toll would be charged to the caller, even though they had not yet been connected to the subscriber (or anyone else), if answer supervision were given at that time. The invention, as it will now be described with reference to FIGS. 4a–4k, overcomes this and other drawbacks and adds additional features, as will become clear.

The software listing which is appended hereto as Appendices I–X generally corresponds to the flow diagrams depicted in FIGS. 4a–4k. While the software listing implements the flow diagrams in most aspects, there are some differences. For example, the description of the flow diagrams indicates handling more than one forward leg call, while the software is currently set up only to handle one forward leg call. Further, the software listing does not include the memo record feature or the music on hold feature, as yet. Such not included features can be readily implemented by those skilled in the art.

The software is written in a language which is specifically adapted to test telephone system technology and is called VOS (Voice Operating System). The software is available from Parity Software Development Corp., of San Francisco, Calif. and runs on the hardware environment of system 40 depicted in FIG. 5, which will now be described. The hardware environment of the system 40 includes an IBM compatible PC (personal computer) 90 having CPU of the Intel 486 family or better. Preferably, the computer is an AST Bravo MT 486DX2 66 with 16 Meg of RAM, a large SCSI hard drive, two serial ports, one parallel port, mouse, video and DOS, or equal. The VOS software supports limited multitasking. The flow diagrams, which will now be described, assume that the system 40 runs in a multitasking environment and those skilled in the art will appreciate in comparing the flow diagrams with the computer code listing that certain compromises were made in implementing the flow diagrams into code.

Figure 5:
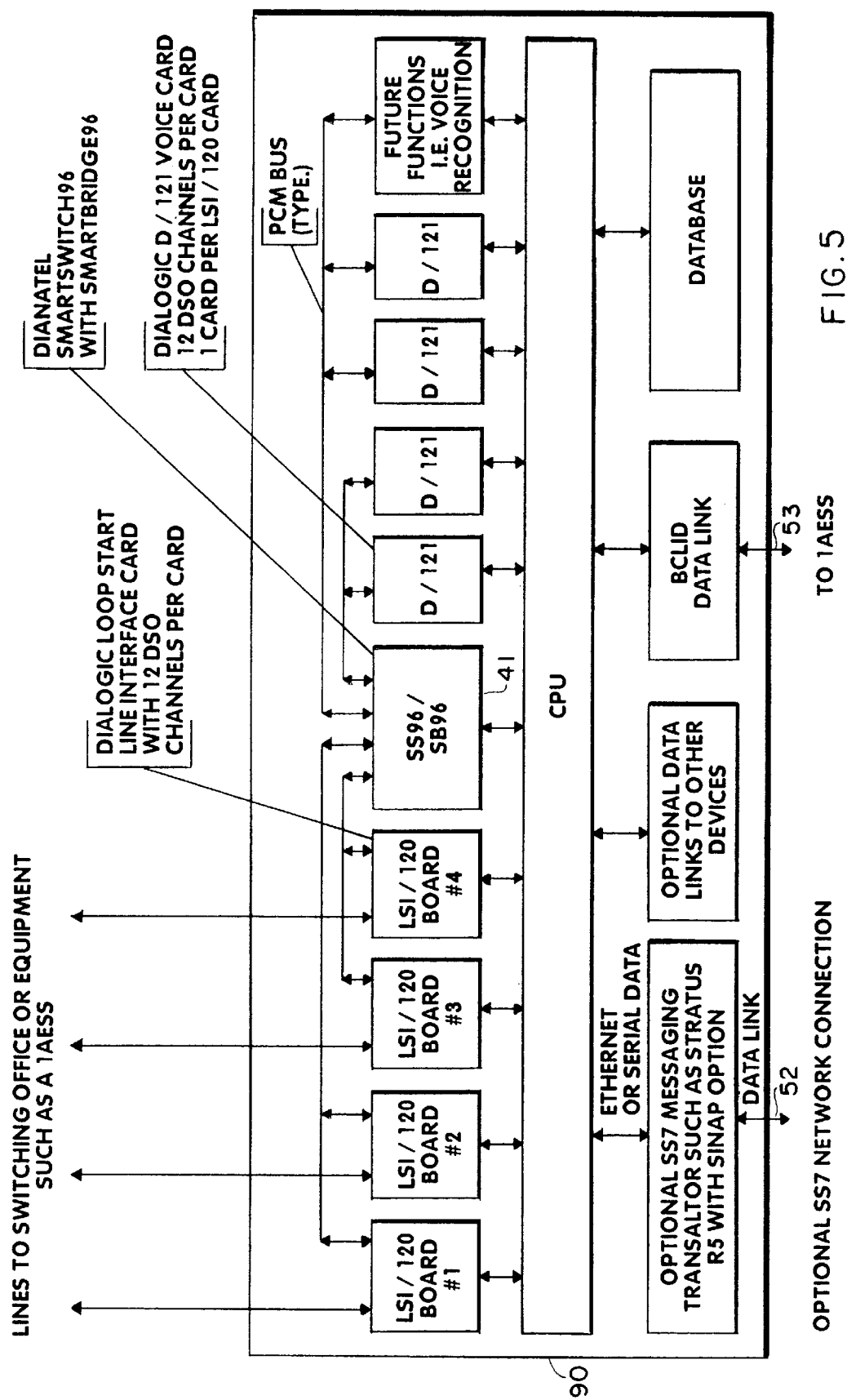
FIG. 5 is a schematic diagram of a hardware environment for the system which connects with one type of telephone company circuits.
Figure 6:
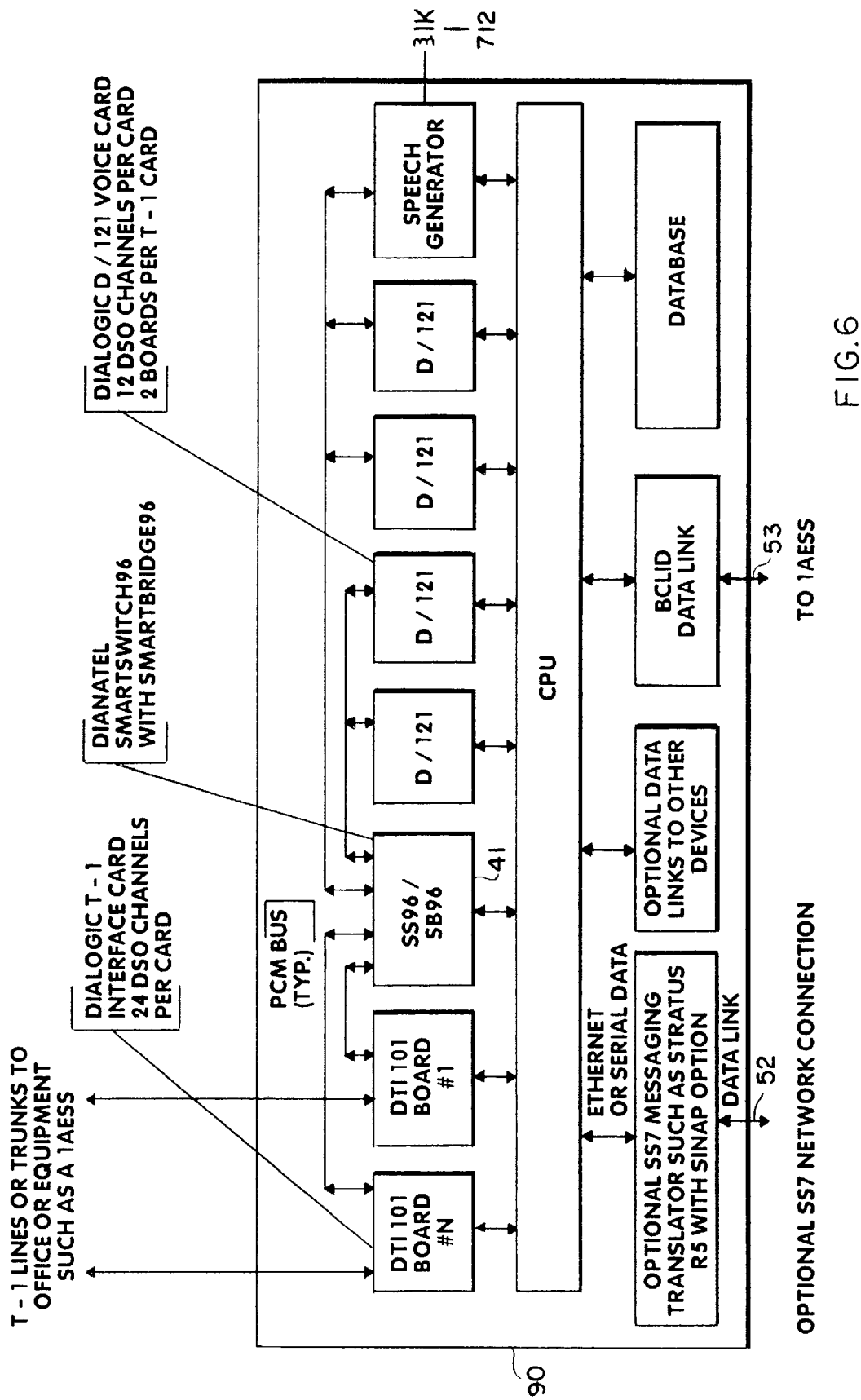
FIG. 6 is a schematic diagram of a hardware environment for the system which connects with telephone company T-1 type circuits.

The hardware platform also preferably includes a Dianatel SmartSwitch96 with SmartBridge96 (switch serves as switch 41 in system 40), Dialogic LSI/120 interface cards, and Dialogic D/121 voice cards. These cards plug into the computer motherboard and are also connected to each other via PCM data busses, as shown in FIG. 5. The software listing in the appendices and the Dialogic cards identified above and in FIG. 5 are set up for working with POTS (Plain Old Telephone Service) loop start lines. With small adaptations to the code and by selecting different interface cards (also available from Dialogic), then T-1 trunks can be used instead. FIG. 6 shows the hardware platform with Dialogic cards installed in the PC for use with trunks 51. In either case, this hardware environment can only support a limited number of active incoming calls. This is fine for a typical business application, such as where the hardware controls a PBX installed at the business, but if this system is to be scaled up to work with large numbers of callers, such as at a telephone switching office, then a more robust hardware/software environment should be used. Those skilled in the art will appreciate that several PCs can be used in tandem and certainly more powerful CPUs can be utilized. VOS was selected as the development environment for the software, but those skilled in the art may choose to use another language in which to implement the invention. The computer may be used to generate sounds, especially if a sound board is added. For example, a SoundBlaster board can be used to generate sounds and computer generated speech as well as using known boards of the SoundBlaster type. The computer may be equipped with a sound generation board if it is desired to generate call announcements over speakers 71 (FIG. 1). Thus the signaling system may be provided by a conventional pager system or a digitized speech system which delivers audible communications over speakers 71 or by a combination of the two systems. Paging could alternatively be accomplished by sending signals to computers on the desks of subscribers, which computers could then not only provide the desired paging function, but could also advise the subscribers of the identities of callers by making use the calling party's CLID. Additionally the Dialogic D/121 voice cards can produce digitized voices stored, for example, on the hard drive, in telephone connections with callers 2, subscribers 65 or parties 8.8' on the forwarding legs. Thus a means for producing courtesy messages to users of the system 40 is available.

Additionally, the system may be connected to receive and send Signaling System Seven (SS-7) messages from and to the telephone company. SS-7 is well known in the telephone industry, and therefore does not need to be described here. FIG. 5 depicts an optional SS-7 messaging translator which can be embodied in a R-5 computer by Stratus with SINAP option.

Figure 4C:
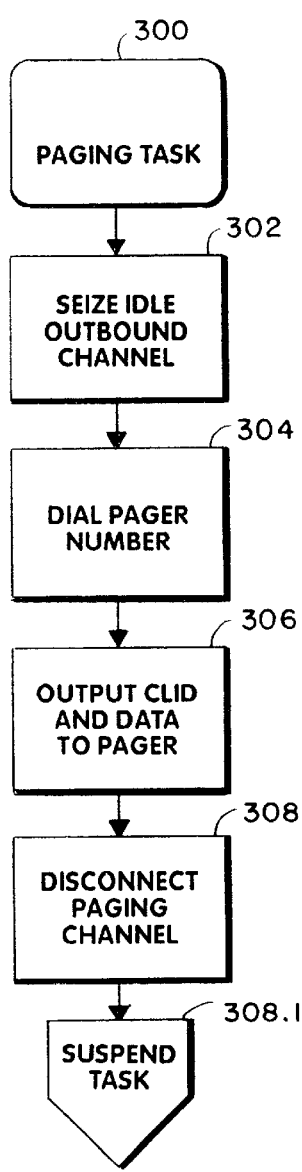
Figure 4A:
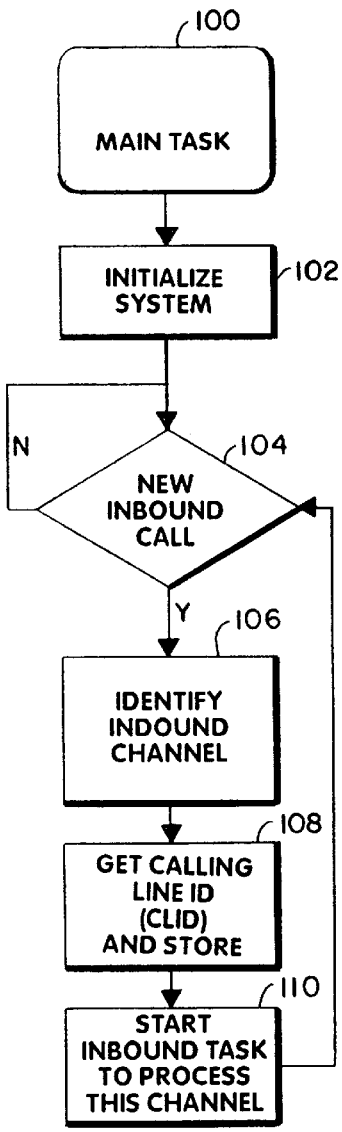

The main task 100 is shown in FIG. 4a. The main task 100 starts off by a step 102 in which the variables which are used during the processing are set to their default values, typical initialization routines run, drivers loaded, etc. After the variables are set up and other housekeeping chores accomplished, the processing falls through a loop which is made around a test made at step 104 to determine if a new inbound call has been received. The inbound call could be a call 3 from a caller 2 or a barge-in or meet-me call 7 from the subscriber or a call from the subscriber merely to check their voice mail, to update one or more forwarding numbers stored in the system or a schedule of forwarding numbers, etc. If a new inbound call has been detected, the processing falls through first to step 106 where the inbound channel is determined, then to a step 108 where the Calling Line IDentification (CLID) is obtained (if available) and then processing then falls through to step 110 where the Inbound Task 200 is started to process the call on the indicated channel.

Figure 4B:
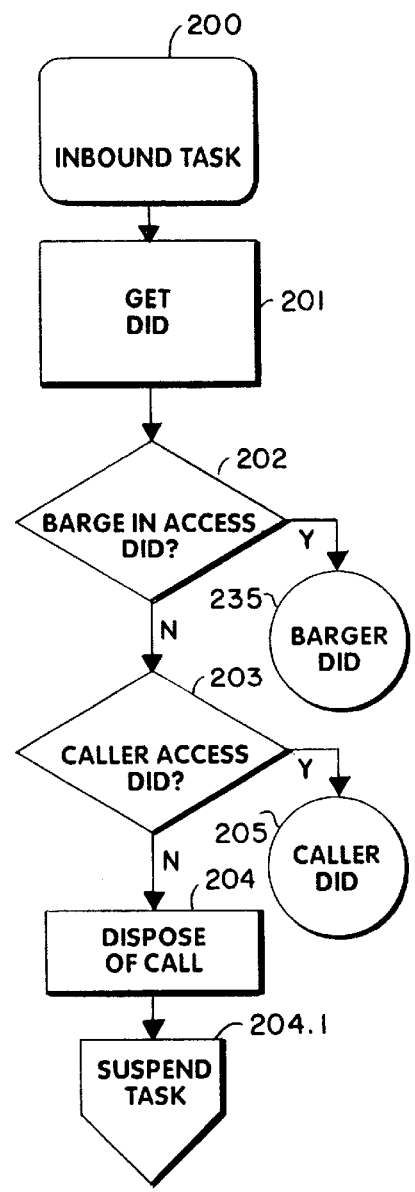

The Inbound Task 200 is shown in FIGS. 4b and 4b(1)–4b(7). The Inbound Task 200 starts off at FIG. 4b by obtaining the Direct Inward Dial (DID) number at step 201. In this embodiment, it is assumed that the subscriber uses one telephone number to call the system, while the subscriber's callers use a different telephone number to call the system. Therefore, the subscriber and the caller can be differentiated by the DID digits. Those skilled in the art appreciate, of course, that the DID digits are supplied by the telephone company to the system. At step 202, a test is made to determine whether the DID digits correspond to the telephone number used by one of a plurality of subscribers in order to gain access to the system. If the DID digits indicate that one of the subscribers has called in, then the processing falls through to step 235, which is continued in FIG. 4b(4). Otherwise, a test is made at step 203 to determine if the DID digits indicate that a caller is trying to telephone a subscriber, in which case the processing branches via connector 205 to the processing shown on FIG. 4b(1). If the DID digits do not result in a positive test at either step 202 or 203, the processing falls through to step 204 where the call is disposed of and the task is then suspended at step 204.1.

By way of a practical example, subscriber 1 may have a telephone number 555-7000 for use by callers and a telephone number 555-7001 for use by the subscriber to gain access. A second caller may have telephone numbers 555-7001 for use by callers and 555-7001 for use by the subscriber to gain access. Of course, it would be envisioned that many more subscribers would be on the system than in this small example, but in this example, the valid DID digits would be 7000, 7001, 7010 and 7013. If a call were made to 555-7009, the processing would fall through to step 204 where the call would be disposed of. That could be by, for example, playing a message to the caller indicating that they had reached an unassigned telephone number. If the DID digits indicate that a call were made to 555-7001, then that call would be identified as a call from the second subscriber for the purpose of gaining access to the system (e.g. to barge into an existing call or to monitor an existing call or to perform other functions). similarly, if the DID digits indicate that a call were made to 555-7000, that call would be identified as a call from a caller directed to the first subscriber.

Assuming that the caller dialed a valid caller access DID, such as 555-7000 for the first subscriber on the system, the processing then falls through via connector 205 to block 206 on FIG. 4b(1) where a test is made at block 206 to determine if the monitor mode is enabled. In the monitor mode the subscriber can monitor the caller(s) to determine if the caller wants to barge into the conference (the caller can be in communication with either the voice mail system or with a person answering on a forward leg) where the caller has been placed by the system. As the reader will note, two different processing paths are taken if the monitor mode is active. Many of the processes in each path have identical or similar processes in the other path. Where such process are identical, or are at least very similar, the same reference numeral is used, but in the monitor mode path those reference numerals have the letter 'M' appended thereto. For example, after step 206, in each path the 'caller' variable is set active for that particular subscriber at steps 207 and 207M. As will be seen, these two paths accomplish very similar functions, and, indeed, the two paths could be combined as the difference in the functions are not highly significant. Rather, they demonstrate two slightly different methods of handling an inbound call by the system each of which have certain advantages.

Considering first the monitoring path, processing then continues on to the next block 208M where the Caller Disconnect Task 900 is started. The Caller Disconnect Task is described in detail with reference to FIG. 4i. After the Caller Disconnect Task has been started, the processing then drops to step 209M where a page to the subscriber is initiated by starting the Start Paging Task 300 (which is described with reference to FIG. 4c), and on to step 210M where a variable called "call waiting" is set true for the subscriber.

At step 212M a test is made to determine if the forwarding number, i.e., the number which is used on a forward leg call, is set to the null character. If so, then no forwarding number is in the system and processing goes on to the Caller Monitor routines via connector 216. If a forwarding number is in the system, then a test is made at step 213M to see if the forwarding number programmed into the system is the same a the DID number. If so, the variable "four rings played" is set to true at step 214. The reason for this is that the present system is preferably used as an adjunct to, or embodied with, the telephone control system disclosed in U.S. Pat. No. 5,375,161. Thus the forwarding number may be set to the subscriber's telephone number used in the apparatus disclosed in that U.S. Patent. If so, then the present system directly forwards the incoming call to that system externally of the PSTN without generating any ringing sounds. Otherwise, such ringing sounds are normally generated, as will be seen.

A Forward Leg Task 500 is started at block 215M and then the processing falls through to the Caller Monitoring routines on FIG. 4*b*(2) via a connector 216. As previously described the system may preferably be programmed to forward the call on a number of forwarding legs simultaneously or in sequence. The system preferably includes a database which stores the various forwarding numbers for a subscriber along with perhaps a schedule indicating at what times the various forwarding numbers are effective. For example, during working hours, including the time the subscriber is normally commuting to and from work, they may decide to have both their work telephone number and a cellular number stored as their forwarding numbers for that time period. At other times they may have their home telephone number stored as the forwarding number, and at still other times they may have programmed the system to direct calls to the voice mail box, or invoke call screening options. Such personal preferences would be preferably stored in a database associated with the system. At the point the processing reaches the block labeled "Start Forward Leg Task," the Inbound Task would look to the database not only to determine the forwarding number then in effect, but preferably also to determine if multiple forwarding numbers were then in effect. If so, the Forward Leg Task 500 would be repeatedly called at this point, once for each forward leg required.

It is to be recalled that this is a multitasking environment such that the Timer Task, Paging Task, the Forward Leg Tasks, and the Caller Disconnect Task can all be running simultaneously with this particular Inbound Task. Multiple instances of the Forward Leg Task and associated disconnect tasks may also be running. Finally, multiple instances of the Inbound Task are likely to be running together with its progeny, i.e., the tasks it calls either directly or indirectly. After the Forward Leg Task 500 is started at block 215M, the caller is added to a conference facility. In due course, assuming that the subscriber makes contact with the system, the subscriber will also be added to that conference. If multiple callers are on the system at the same time trying to contact different subscribers, then multiple conferences are similarly set up. After step 215M, the processing falls through a connector labeled with the numeral 216, which can also be found on FIG. 4*b*(2).

Referring now to FIG. 4*b*(2), the processing first enters a first loop comprising steps 217M, 218M, 220M, 222M, 223M, 224M and 225M. At step 217M a test is made to determine if either four rings have occurred or if the variable 'four rings played' is currently set true. If yes, the incoming call branches to a block where a voice mail subroutine 234 is called, before returning to the first loop. This branch is taken if either four rings have been played at step 219M or if the subscriber has called in or answered a forward leg call. In the latter case, the incoming caller is sent immediately to voice mail so that the subscriber can monitor the caller's interplay with voice mail. The processing loops in the first loop until voice mail comes up (a voice mail call is answered if it is, for example, an external voice mail machine), in which case the test made at step 225M causes the first loop to exit via steps 226M and 226.1.

Continuing through the first loop, the "no" branch from step 217M enters a test at step 218M which determines if a ring should be generated. Since the caller has not yet been added to the conference, and since answer supervision has not yet been returned, the ringing sounds are artificially generated. Ringing sounds have a particular cadence, and the test at step 218M assures that the ringing at step 219M follows the desired cadence. If the party enters the ## keys at the keypad of their telephone, that action is detected at step 220M for the purpose of setting the "priority call waiting" variable at step 221M. If the party enters the *9 keys at the keypad of their telephone, that action is detected at step 222M and the voice mail subroutine 234 is called. If a forward leg has been answered, then the test made at step 223M will cause the processing to exit via its "yes" leg to block 226. If the subscriber has barged into the conference on the barge-in leg 7 and has left the monitoring mode (i.e. depressed the * key as tested at step 243, FIG. 4*b*(4)), then the a test made at step 224M will cause this loop also to be exited to block 226. This might occur after the first loop is exited at step 217M in order to start voice mail and then reentered, but with the test at step 225M failing (because voice mail failed to respond). Thus the caller and the subscriber can still be placed into telephone contact in the monitoring mode even if voice mail fails.

If a forward leg is answered, or if the subscriber barges into the conference, or if the calling party is sent successfully to voice mail, then the processing falls out of the loop to block 226, as previously mentioned. At block 226.1 answer supervision is returned to the caller (i.e. toll charges start if it is a long distance call and two-way communications become available—two way communications are often inhibited by long distance carriers until answer supervision is returned). After block 226.1 a second loop is entered which comprises steps 228M, 257M, 229M, 230M, 231M, 232M and 233M. If the caller enters *9 at the keypad of their telephone in this loop, the loop exits via step 227M where music is stopped (assuming it was started at step 238M), and calls the voice mail routine 234. Thus, the caller enters the first loop where they can hear generated ringing sounds. If by four rings either a forward leg answers or the subscriber has called in (in response to a page), or four rings have occurred, and the caller has been sent to voice mail and voice mail has answered, then the second loop is entered which normally just loops around steps 228M, 257M and 229M. While in the second loop, if the subscriber answers a forward leg call, or barges into the call in response to a page, then the subscriber is added to the conference with the calling party.

The second loop expands to include steps 230M, 231M, 232M and 233M when the forward leg answers (as detected at step 229M), and then hangs up (as detected at step 230M) so long as the calling party is not active in voice mail. For example, the person answering on a forward leg may tell the caller that the subscriber is expected to phone the system in order to talk with the caller, and therefore the caller should wait on the line. During this waiting time, the caller hears a message about leaving a message (at step 232M), or music (via step 233M). The second loop also tests at step 228M for the caller touching *9 (to go to voice mail via subroutine 234).

If monitoring mode is not active, then the test at step 206 on FIG. 4*b*(1) takes the other branch. The call processing of the inbound call is similar to the monitoring mode processing just described, with the following more significant differences: Answer supervision is returned earlier (at step 207.1 instead of at 226.1), and the caller is added to the conference earlier (at step 211 instead of at step 226). Thus, instead of hearing a simulated number of rings (as at steps 218M and 219M), the caller hears one ring (step 213.1) and messages (at steps 213.2 and 213.3) before the Forward Leg Task 500 is started at block 215. Additional simulated ringing is played at steps 217 and 218 only if there is no forwarding number (i.e., the forwarding number is equal to null). Typically, processing is via block 213 and the message blocks to block 212 then thence to step 215, and then on to connector 256 (see FIG. 4*b*(3)).

Turning now to FIG. 4*b*(3), the call processing on this sheet is similar to FIG. 4*b*(2) in that there is a first loop (comprising steps 220, 222, 223, 224 and 225), and a second loop (comprising steps 228, 257, 229, 230, 231, 232, and 233). The call handling is nearly the same for both modes (monitoring and non-monitoring), the more major differences having been spelled out above. These differences have little impact on whether the subscriber decides to utilize the monitoring mode, and thus are primarily set forth here as two possible techniques for handling the incoming call from a caller.

Turning now to FIG. 4*b*(4), assuming that the DID digits detected at step 202 were associated with the subscriber barge-in telephone number, such as 555-7001 in the prior example, the processing falls through connector 235 to step 236 where answer supervision is returned for the barger's telephone call. At step 237 a Barger Disconnect Task 400 is started. Processing then continues on to step 238 where a test is made to determine whether or not a caller is active on the system. If not, the processing branches to step 248 after playing a ring at step 238.1. Otherwise, a caller is on the system and the processing falls through to step 239 where a test is made to determine whether or not the subscriber has a Personal Identification Number (PIN) stored. If a PIN is stored, then the "no" leg is taken and a ring is played at step 239.1. Otherwise, the "yes" leg is taken to step 258 where a test is made to see whether or not the monitoring mode is active. IF the test at step 258 is "yes", then the processing falls through to step 241 where 'four rings played' is set active.

If the "no" leg is followed from step 238, meaning that no caller is on the system, then the party who telephoned is given a short period of time (one second in the present embodiment) at step 248 to start entering a PIN after the ring is played at step 238.1. In this embodiment it is envisioned that the subscriber has two personal identification numbers: one for the purpose of programming (which may be a longer, more complex PIN) and the other to meet a caller in the conference (i.e., to barge into the conference) for which a different PIN, which is preferably shorter, or even nonexistent, may be used to make it easier to enter and to gain access to a telephone call). If the person starts entering data within the one second delay, then processing branches to step 250.

If the "no" leg is followed from step 239, meaning that a caller is active and the subscriber has a PIN which must be entered, a message is played at step 239.2 advising that a call is waiting and a PIN is requested at step 249. If the subscriber has entered their programming PIN, then a test made at step 250 is satisfied, and processing falls through to step 251 wherein the subscriber can change their program variables, their forwarding number(s), voice mail attributes, their schedule, activate or deactivate the monitoring mode, or gain access to their voice mail system. Those tasks are not described in detail here since it is known in the art how to change such variables.

If the person calling on the barge-in line inputs the barge-in PIN at step 252, it must be the subscriber who is trying to join the conference. Processing then falls through to step 253 where a test is made to see if a caller is active for this subscriber. Normally, if the subscriber is responding to a page, then the caller variable is active, and, if true, processing continues via block 258. If a caller is not active, the subscriber is advised at step 254 that there is no call waiting, and processing returns back to step 249. If the person telephoning does not enter a PIN at step 248, then the processing continues via connector 280 to FIG. 4*b*(6).

The variable "four rings played" is set at step 241. If the calling party is still in the first loop of FIG. 4*b*(2), setting "four rings played" variable to true causes the calling party to be immediately transferred to voice mail where the subscriber can monitor the calling party. Indeed, step 242, which follows step 241, adds the barger to the conference in a listen only mode (i.e. a half duplex mode) about the same time the calling party is added to the conference. As will be seen, the voice mail system is also connected to the conference for the purpose of recording the incoming party's message (and thus allowing the subscriber to ascertain who is telephoning before taking the call).

A short loop comprising steps 243 and 244 is entered while the subscriber monitors the incoming call. The subscriber can (i), enter the conference by pushing the * key (as tested at step 243); or, (ii), remove himself or herself from the monitoring mode by either depressing the # key (as tested at step 244 and implemented at step 255), or simply hanging up (in which case the subscriber is removed from the conference by the Barger Disconnect Task 400). If the subscriber decides to speak with the calling party, they merely depress the * key and then enter the conference in full duplex communication at step 246. At the same general time, the variable "barger" is set active (see step 245) and, after the subscriber barges in, a joining tone is played at step 247 to advise the calling party that the barger is coming in and call waiting is reset at step 247.1. Processing then proceeds to the Barger Answer routine on FIG. 4*b*(5) via connector 260.

Referring now to FIG. 4*b*(5), at this point the subscriber has been identified as wanting to barge into the telephone call with the caller, and since the caller is in a conference (see steps 211 and 226), the subscriber has been added to that same conference (at step 246), and a tone was played (at step 247) which all parties in the conference can hear so that they know that the subscriber has barged into the call. The processing on the barger leg 7 now enters a loop at steps 290, 262, 266, 268, 269, 270, 273, and 275 to determine whether the subscriber 65 enters certain codes at his or her keypad of their telephone instrument 6 and to perform certain other tests. As will be seen, certain codes control a call waiting feature, while other codes allow a message to be recorded, or an outbound call to be initiated, or forward leg calls to be brought down, or other features to be utilized.

In the example shown in FIG. 4*b*(5), the loop first calls a subroutine 290 (see FIG. 4*b*(6)) which checks to see if a new call from another caller is received. The loop next tests at step 262 to determine if  is entered at the subscriber's keypad. If so, the subscriber can first answer the subsequent call and then toggle between two conferences at steps 263 and 265. The loop then tests for #8, or #9, to be entered at the keypad. If #8 is entered (as tested at step 266), that will stop forwarding leg tasks at step 267, and as will be seen, that action will disconnect the forwarding legs 9, 9' if it has (they have) been connected. If the subscriber enters #9 (as is tested at step 268), the voice mail subroutine 234** is called. If more than one caller have telephoned the subscriber at more or less the same time, they will join separate conferences and the variable "call waiting" will be set active (i.e. true).

The loop next tests (at step 269) for #4 being entered at the keypad indicating that the subscriber wants to initiate an outbound call. If so, an Outbound Call subroutine 277 is called. The loop next tests (at step 273) for #3 being entered at the keypad indicating that the two conferences are to be joined together. A test is made at step 271 to determine if two conferences are active, and, if so, then they are joined at step 272 and an appropriate tone is played at step 272.1. The loop also tests for the entry of #6 (at step 273) and #7 (at step 275) for starting and stopping a recording device. This feature allows a party to the conference to take a voice memo and store it, preferably as a voice mail message for the subscriber. Thus, important topics which are discussed with a caller can be recorded. If needed, a periodic tone can be easily generated while the parties conversation is being recorded. The recording task is started at step 276 and stopped at step 278. This loop has no explicit exit, but it is exited when the Inbound Task for the barger is suspended by the Barger Disconnect Task 400.

One of the advantageous features of the present invention is that either the subscriber, or the caller, or any party on a forwarding leg, can start the voice mail task 700 when they are in telephone communication via the conference with another party so that a joint message may be left in the subscriber's voice mailbox. This can be very useful in certain situations. For example, the subscriber may be in an automobile and may be connected to the system via a cellular telephone. That can be a very inconvenient time, indeed, an unsafe time, to take notes. By allowing the voice mail to be started while the parties are in the conference, by any party, it allows a voice note to be stored which the subscriber can then go back and listen to when in a more convenient location. As has been described, the system also permits the caller to start the voice mail task 700 (see steps 222 and 222M) so that the subscriber need not take his or her hands off the automobile wheel in order to have the voice mail task 700 started.

Another advantageous feature of the present invention is that the subscriber can make outbound calls in a new conference while speaking with a party in another conference. For example, the subscriber, while speaking with a first party, may decide that they need more information from a second party. The subscriber can call the second party in a new conference, speak with them, and then either toggle between the two conferences (by keying **), or join the two conferences into a single conference (by keying #3). The Outbound Call subroutine 277 on FIG. 4b(6) implements this feature.

In the foregoing description, the various loops wait for keys to be pressed in order to invoke additional features. Voice recognition systems are well known, and therefore some practicing the present invention may find it useful to have the loops sense not only for the operation of keys on a keypad, but also to initiate the described functions in response to voice commands.

Turning now to FIG. 4b(6), the "Barger NoEntry" routine 280, "Start Voice Mail" subroutine 234 and "Barger Call Waiting" subroutine 290 are depicted.

In the Barger NoEntry call processing, the caller on the barge-in leg has not entered a PIN as tested at step 248 on FIG. 4b(4) and, of course, no call was waiting to be answered. The party is permitted to enter voice mail, in that a new conference is set up at step 281, and voice mail is started at step 282, and added to that conference. The Barger Call Waiting routine 290 is called followed by step 284 and 285 which loop with the call to routine 290. In this loop, a test is made at step 284 for the entry of "" at the keypad of the barger's telephone instrument. If a caller calls in while the barger is in active invoice mail, the barger will hear two beeps (played by routine 290) and if the barger enters  at the keypad, barger is set active at step 286 before branching to step 287 (the barger toggle connector).

The Barger Outbound Call routine 277 is also depicted on this figure. At step 277.1 a test is made to determine if a call destination is selected. The "no" leg is showing looping on step 277.1, but it is understood that if a valid destination is not selected after reasonable opportunity is given to do so, or if the barger elects to escape from this function, the routine would simply return to its calling point. If a valid destination is selected, then, if necessary, the destination phone number is looked up at step 277.2 (for example, a speed dial number may be used to identify a destination) before an outbound channel is seized (step 277.3) and the number of the destination is dialed (at step 277.4). The barger is added to a new conference (step 277.5) and the outbound channel is added there as well (step 277.6). If the outbound call is answered, as is tested at step 277.7, the routine simply returns at step 277.11. Otherwise, if busy, or no answer occurs, then the barger is switched back to the conference from which he came at step 277.8, the outbound call is disconnected from the conference, and the call is torn down at steps 277.9, and 277.10.

Turning now to the Barger Call Waiting subroutine 290, if call waiting is not active (as tested at step 290.1), the routine merely returns. Otherwise call waiting tones are played twice (as tested at step 290.2) to the subscriber. For normal call waiting, one type of waiting tone is played (at step 290.6), while if the caller has indicated that their call is a priority call (see steps 220, 221, 220M and 221M), a different call waiting tone is played at step 290.5.

The "Start Voice Mail" subroutine 234, which is depicted on FIG. 4b(7), starts off by testing to see if voice mail is already active at step 234.1. If so, nothing further is needed and the subroutine exits at step 234.7. Otherwise, a test is made at step 234.2 to determine if voice mail is enabled. If not, a courtesy message is played at step 234.3 and the routine exits (returns) at step 234.5. If voice mail is enabled, then the Start Voice Mail Task 700 is called at step 234.4 before exiting at step 234.5.

In this embodiment it is assumed that voice mail is provided by a separate service provider available via the PSTN 50 (such a service provider may have a voice mail equipment of the type made by Octel, for example). Thus, some subscribers may opt not to subscribe to a voice mail service and that choice would be stored in the aforementioned database (together with the telephone number of the voice mail service, if available for the subscriber). Thus, the test made at block 234.2 can be determined by examining the database, for example. If voice mail is available, the Voice Mail task 700 is started if it is idle for this subscriber at step 234.4. Similarly, if voice mail is not available, the caller would be preferably informed of that fact at block 234.5, after which the subroutine returns at 234.5.

Instead of utilizing an external voice mail system, the voice mail system may be embodied with the present system, if so desired.

Turning now to the Paging Task 300, that will now be described with reference to FIG. 4c. Recall that the Paging Task runs concurrently with the Inbound Task (see steps 208 and 208M on FIG. 4b(1)). When the Paging Task is started, an outbound channel is seized at step 302. The telephone number of the subscriber's paging system is dialed at step 304. Appropriate I.D. information is output to the pager at step 306—this will preferably include the CLID of the caller (if available) so that the pager can display the telephone number or other information about the caller on the display of the pager. The CLID, if available, can also be used to look up information about the caller, such as the caller's name, etc., in the database for transmission to the subscriber. Thereafter, the paging channel can be disconnected at step 308 and the task suspended at step 308.1. This processing assumes, of course, that the pager is controlled by a typical dial-up pager connected via the PSTN 50. That is a common way of dealing with the pager, since the pager system facilities are often provided by a separate company. However, another way of dealing with the pager system is to use a direct, dedicated connection between system 40 and the pager system, so that instead of seizing an outbound channel and dialing the pager company via the PSTN, such as shown in steps 302 and 304, the system would preferably seize the dedicated connection to the pager company and output the necessary information directly at step 306. Additionally, the Pager Task can also be used to instruct a digitized speech system to deliver audible pages over speakers 71. Indeed, the Inbound Task 200 can start more than one instance of the Pager Task 300 so that the subscriber is paged both audibly and via a conventional pager device 61, if desired. At the same time the Paging Task(s) 300 is (are) being run, the Forward Leg Task(s) 500 is (are) also being run.

Figures 4D, 4J, 4K:
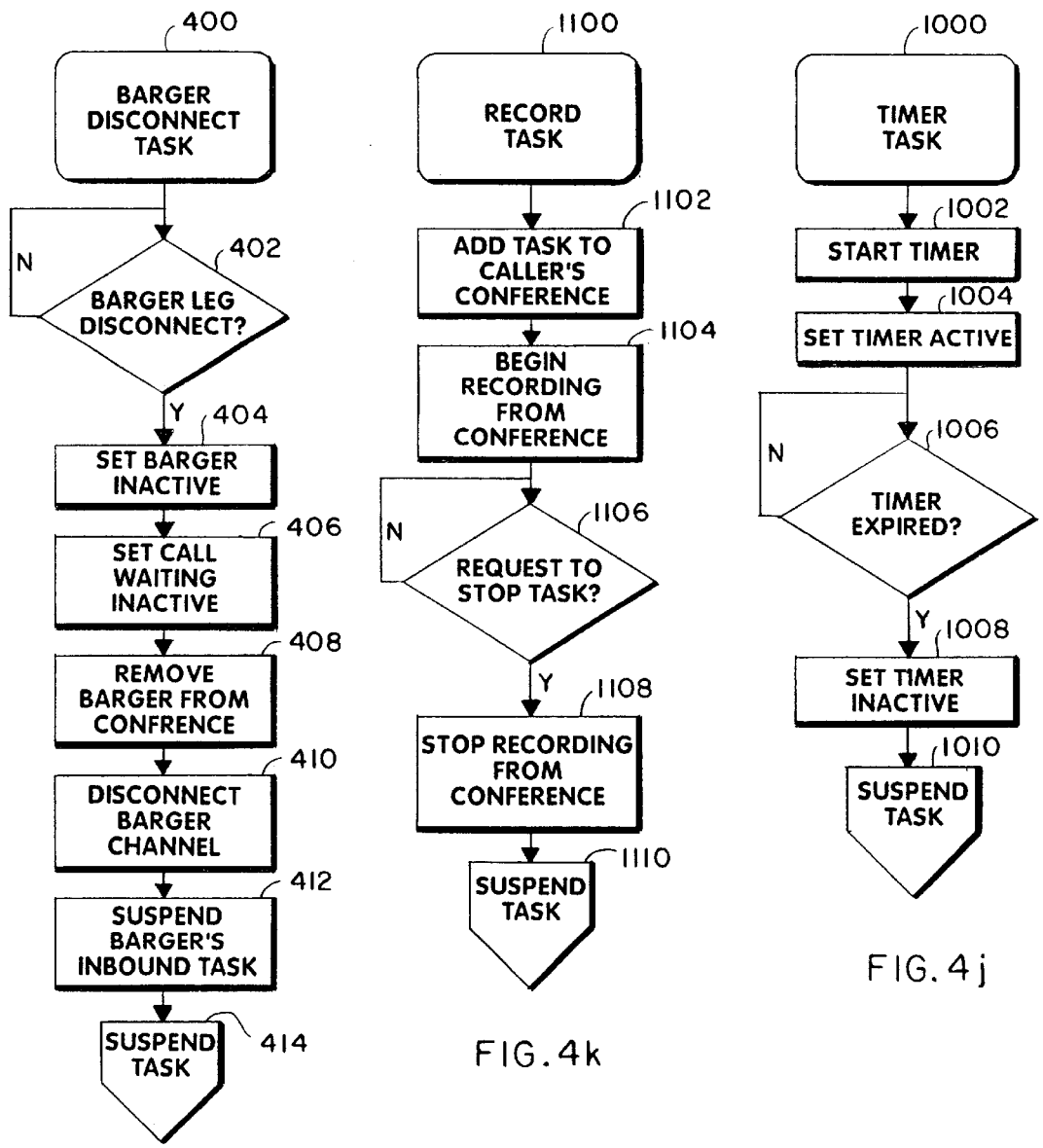
Figure 4G:
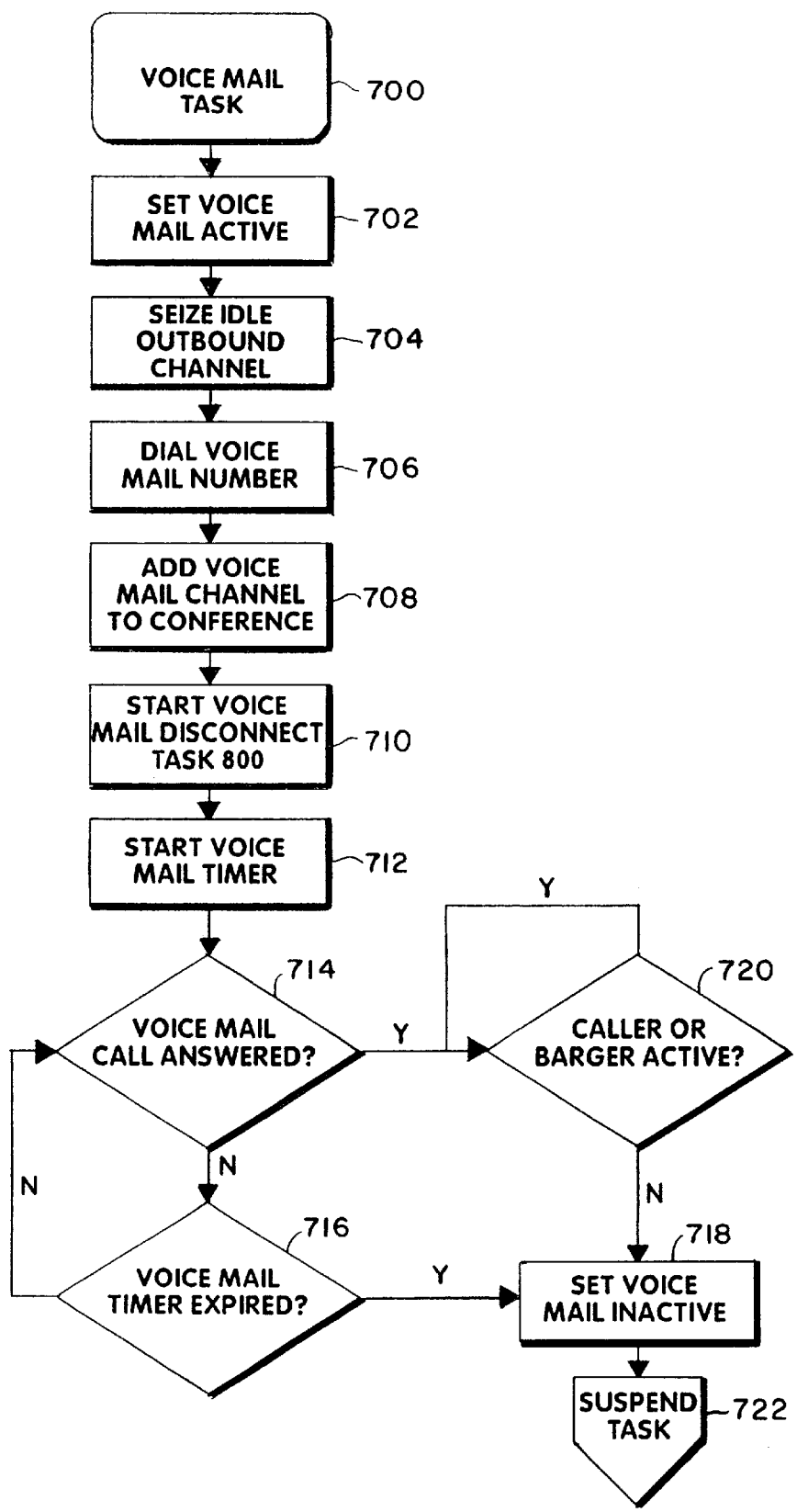

The Barger Disconnect Task 400 is shown at FIG. 4*d*. A test is made at step 402 to see if a disconnect which has occurred on the barge in leg 7. If so, the barger variable is set inactive (false) at step 404 and the call waiting variable is similarly set inactive (false) at step 406. The subscriber is disconnected from the conference at steps 408 and 410. The caller and the party on an active forward leg will remain in the conference. This is a useful feature. The subscriber may barge into a conference and find their secretary and the caller already engaged in a conversation. The subscriber's secretary, in this example, is on a forward leg 9, 9'. If the secretary can handle the matter for the caller, the subscriber can simply excuse themselves from the conference and hang up—the caller and the secretary on the forward leg remain in communication. Before suspending the Barger Disconnect Task at step 414, the Inbound Task 200 which the subscriber (barger) is on is suspended at step 412.

The Forward Leg Task 500 will now be described with reference to FIGS. 4*e*(1)–4*e*(4). The forwarding active variable is set at step 502 and then an idle outbound channel is seized at step 504. The number of the telephone 8 on the forwarding leg 9 is then dialed at step 506. This may be a number available via the PSTN or may be an extension number of a directly connected PBX. The forward leg channel is then added to the conference at step 508 so that the calling party can hear the call progressing (alternatively they can be supplied with generated sounds which may sound like normal call processing, such as the rings generated in the first loop on FIG. 4*b*(2)). If multiple legs are being utilized, then it would probably be preferable to either supply the caller with generated sounds or to delay adding a forward leg to the conference until the forward leg is answered, otherwise hearing multiple legs being dialed and/or ringing, more or less simultaneously, would not be especially helpful to the calling party. In that case, or alternatively, a message could be played to the caller informing that the system is attempting to contact the subscriber at a number of locations.

The Forward Leg Disconnect task 600 is then started at step 510, and, thereafter, the processing proceeds to step 512 where a first timer is started, and then to step 514, where a test is made to determine whether the forward leg call has been answered. If so, the processing then continues to the forward routine on FIG. 4*e*(2) via connector 540. Otherwise, a test is made at step 518 to determine whether the forwarding leg is busy and, if not, then a test is made at step 520 to determine whether the first timer set at step 512 has expired. If the first timer has not timed out, then program loops, waiting either for the forward call to answer or for the first timer to timeout. If the first timer times out, or if a busy condition is detected, then a call to the voice mail subroutine 234 is made before falling through to step 522, where a test is made to determine if voice mail is available. If so, a second timer is set at step 528 and answering of the forward leg is again tested at step 530 in a small loop with block 532 where expiration of the second timer is tested. If it expires, or if the test made at step 522 fails, then forwarding is set inactive at block 534 to remove this forward leg from the conference and to disconnect this forward leg channel. The Forward Leg Task is thereafter suspended at step 536. Otherwise, if the forward leg is answered as tested at step 530, the processing goes to the forward routine on FIG. 4*e*(2) via connector 540.

A busy condition can be tested by a number of different techniques. For example, the system can be listening for the tell-tale busy sound. The Dialogic card previously mentioned have such capability. If the system is connected to the PSTN via SS-7, then a data packet can be returned to the system indicating busy without even the need to open an audio channel to the number being telephoned. Finally, when the system is connected to or with a PBX, the PBX can readily advise whether or not an extension is busy.

Assuming that the forwarding leg call is answered, as is tested at steps 514 and 530, the processing continues via connector 540 to the flow diagram of FIG. 4*e*(2) and to block 541 where a test is performed to see if monitoring mode has been enabled. If not, further processing is through the forward answer routine on FIG. 4*e*(3) via connector 560, after first adding the forward leg to the conference as a listener (i.e. in full duplex mode) at step 547, stopping the voice mail task (at step 548), and testing to determine if the barger is active (at step 549). If the barger is not active, then call waiting is also reset at step 550.

If monitoring mode has been turned on, for example by the subscriber, then the subscriber is first added to the conference as a listener (i.e., in half duplex) at step 542 before a loop comprising blocks 543 and 544 is entered. In the loop the subscriber can listen to the caller's interplay with voice mail and make a decision regarding whether or not to join the conference which the caller is in. The subscriber joins by depressing the * key (as tested at step 543), and leaves by depressing the # key (as tested at step 544), or, alternatively, by hanging up. If the subscriber exits by the * key, then they are removed from the conference at step 551, the forward channel is disconnected at step 552 and call forwarding is set inactive at step 553. The task then suspends at step 554. If the subscriber depresses the * key, then the processing continues via block 546 where a joining tone is played before continuing with steps 547, 548 and 549.

If the subscriber is going to barge into the call, then processing continues on FIG. 4*e*(3). The processing on the figure is very similar to the processing previously described with reference to FIG. 4*b*(5). There is good reason for this. The processing on FIG. 4*b*(5) tests for commands from the subscriber to enable certain features. The processing on FIG. 4*e*(3) test for many of the same commands for the party answering a forward leg call. Thus, the processing loops in a loop which includes a call to a Forward Leg Call Waiting subroutine 590 and steps 562, 566, 568, 569, 570, 573, 575 and 578.

The party on the forward leg can toggle between conferences as tested at steps 562, 562.1, and 563. Compared with the corresponding testing made at steps 262 and 263, the testing on the forward leg includes an additional test (at step 562.1). The additional test at step 562.1 tests for the barger being active. If so, the ability to toggle between conferences is taken away from the person on the forward leg.

Similarly at step 570.1 where the ability to join conferences by depressing the #3 keys is taken away from the person on the forward leg if the barger is active. Otherwise the processing of steps 566, 567, 568, 569, 570, 571, 572, 572.1, 573, 574, 575 and 576 corresponds with the previously described processing of similarly numbered steps 266, 267, 268, 269, 270, 271, 272, 272.1, 273, 274, 275 and 276, respectively. The loop on FIG. 4e(3) also contains an explicit exit via step 578 which is described below.

A test is made at 568 to see if the person on the forward leg enters #9 at their keypad. That person would typically be the subscriber, but could be a third party who answered the caller's telephone call. If they enter #9, the Voice Mail subroutine 234 is called. The test at step 578 determines whether the caller or barger is active. If neither the caller 2 nor subscriber on the barge-in leg 7 is active, there is no point in allowing the forward leg to remain up, so the processing falls through to step 579 where the forwarding is set inactive, and thereafter, the forwarding task is suspended at step 579.1.

The Forward Outbound Call routine 577 is depicted on FIG. 4e(4). At step 577.1 a test is made to determine if a call destination is selected. The "no" leg is showing looping on step 577.1, but it is understood that if a valid destination is not selected after reasonable opportunity is given to do so or if the subscriber elects to escape from this function, the routine would simply return to its calling point. If a valid destination is selected, then, if necessary, the destination phone number is looked up at step 577.2 (for example, a speed dial number may be used to identify a destination) before an outbound channel is seized (step 577.3) and the number of the destination is dialed (at step 577.4). The person making the outbound call is added to a new conference (step 577.5) and the outbound channel is added there as well (step 577.6). If the outbound call is answered, as is tested at step 577.7, the routine simply returns at step 577.11. Otherwise, if busy, or no answer occurs, then the party is switched back to the conference from which they came at step 577.8, the outbound call is disconnected from the conference, and the call is torn down at steps 577.9 and 577.10.

The Forward Call Waiting subroutine 590 is also depicted in this figure. If the barger is active (as tested at step 591), or if call waiting is not active (as tested at step 590.1), the routine merely returns. Otherwise call waiting tones are played twice (as tested at step 590.2) to the party. For normal call waiting, one type of waiting tone is played (at step 590.6), while if the caller has indicated that their call is a priority call (see steps 220, 221, 220M and 221M), a different call waiting tone is played at step 590.5.

Turning now to FIG. 4f, the Forward Leg Disconnect task 600 is now described. This task bears some resemblance to the Barger Disconnect Task 400 previously described. Here, an initial loop comprises two tests, made at steps 602 and 604, instead of one test. The test made at step 602 detects whether a disconnect has occurred on the forward leg which this task is monitoring. The test made at step 604 tests a variable "forwarding active" to see whether forwarding is active. If it has been set inactive, then the forward leg is brought down, i.e., disconnected. This can occur, for example, under control of the subscriber on the barge-in leg, if the subscriber on the barge-in leg satisfies the test at step 266, for example, by depressing the keys #8, in which case forwarding leg active variable is reset (set inactive). In that way, the subscriber on the barge-in leg can cause the forwarding leg to disconnect. That can be useful where the subscriber wants to make sure they have a private conversation with a caller, without fear of having someone eavesdropping on a forward leg 9, 9'. Otherwise, if a party is on the forward leg, the subscriber is on the barge-in leg, and the caller is on the caller leg, a three-way (or more) conference will be in place.

After the loop is exited, forwarding is set inactive at step 606 and the leg is removed from the channel at 608, disconnected at 610, and the associated Forward Leg Task 500 is suspended at 612. Then this task suspends itself at 614.

As previously discussed, Voice Mail Task 700 is preferably provided which can attach the members of the conference to the subscriber's voice mail system so that notes may be taken or so that a message for the subscriber may be recorded. The voice mail task 700 is described now with reference to FIG. 4g.

The voice mail system may be either a separate stand alone system, for example of the type disclosed in U.S. Pat. No. 5,375,161 (the disclosure of which is hereby incorporated herein by reference), or an integral system. In the present embodiment, it is assumed that the present system is connected to the Telephone Call handling system disclosed in U.S. Pat. No. 5,375,161 by dedicated connections. However, connections via the PSTN 50 may also be used. In either event, the voice mail system is controlled by inputting appropriate codes into the voice mail system. Assuming for the moment that the voice mail system is a separate stand-alone system, the voice mail variable is set active at step 702, an output channel is seized at step 704, the voice mail telephone number is dialed at step 706 and appropriate codes to access the subscriber's voice mailbox are outputted. The codes may be stored in the previously described database. Thereafter, at step 708, the voice mail channel is added to the conference, and the voice mail disconnect task 800 is then started at 710. Next, a voice mail timer is started at block 712 to ensure that the voice mailbox is answered within a predetermined time period. That test is made by looping at steps 714 and 716. If the timer expires, the voice mail variable is set inactive at step 718 and the task suspends at step 722. If the voice mail system answers, as is tested at step 714, the processing goes through to a short loop at step 720 where a test is made to see if the caller or the barger is active. If neither one are active, the processing falls through to step 718 where voice mail is set inactive and the task is then suspended at step 722.

The Voice Mail Disconnect task 800 is shown in FIG. 4h. A test is made at step 802 to see if a disconnect has occurred on the voice mail leg. Normally, one would not expect a voice mail system to disconnect, but that could occur, and therefore, a test is made for that event at step 802. More likely, some action will set voice mail inactive, in which case the processing will fall through from the test made at step 804 to step 806, 808 and 810. At step 806, voice mail set inactive, if not already done so by some other action. The voice mail channel is removed from the conference at step 808, the voice mail is disconnected at step 810, the voice mailbox task is suspended at step 812, and the voice mail disconnect task suspends itself at step 814.

The Caller Disconnect Task 900 is shown in FIG. 4i. This figure is very similar to FIG. 4f, and therefore, it is not described in detail other than it is noted instead of checking a forward leg 9, 9', the caller leg 3 is checked. If the caller active variable becomes inactive, the caller link is brought down. That could occur, for example, by the subscriber entering a defined key sequence while in the loop depicted on FIG. 4b(5). Of course, that would require another test in that loop to detect the defined key sequence, and then the subscriber would have the ability to cause all connections to come down.

The Timer Task 1000 is depicted in FIG. 4j. This task starts a timer at step 1002 to set the timer active variable at step 1004. A test is made at step 1006 to determine if the timer has expired. If so, the processing falls through to block 1008 where the timer variable is set inactive and then the task suspends itself at step 1010.

A Record Task 1100 is depicted in FIG. 4k. This task is called whenever a memo is to be recorded. The task starts off by adding itself to the caller's conference at step 1102. Recording begins at step 1104 and continues until the task is halted, as tested at step 1106. When halted, the task stops recording and posts the message to the subscriber's voice mail (at step 1108) and then suspends (at step 1110).

Comparing the functionality of FIGS. 4a–4k with the system described in FIG. 2, those skilled in the art will, of course, appreciate that the system implementing the flow chart of FIGS. 4a–4k is much more robust. In FIG. 2, provision is made for the ability to park the caller and for a parked timer to expire. See, for example, steps 38–44. In the present multitasking embodiment described with reference to FIGS. 4a–4k, there is no need to explicitly park the caller. If the person answering the telephone on the forwarding leg hangs up, that brings down the forwarding leg, but does not affect the caller on the calling leg 3. During that time, the Inbound Task would still be looping during the loop comprising the steps 220–225, or the loop comprising steps 217M–225M.

Additional Features

Additional features are envisioned for the disclosed system. The hardware environment may include the ability to receive, decode and transmit SS-7 messages, as previously described. The SS-7 facilities being implemented in the PSTN can provide messages to the system 40 indicating, for example, that a subscriber has turned on their cellular phone 81. Each time a cellular phone is turned on it must sign onto the cellular system 80 with which it communicates. The cellular system 80 can send a SS-7 message to system 40 informing the system 40 that the cellular telephone 81 has just 'signed on to the cellular system 80. The database of system 40 is used to determine how many Pager Tasks 300 need to be started in response to a caller's call (in addition to determining how those pages are to be made), and how many Forward Leg Tasks 500 need to be started in response to a callers call (in addition to determining to which telephone addresses the forward leg calls are to be addressed). This information may be stored as a normal schedule for the subscriber, as previously mentioned. The SS-7 messages, such as the message noted above, can be used to override the preprogrammed schedule. For example, at 10:00 A.M. weekdays the preprogrammed schedule "thinks" that the subscriber is in his, or her, office. However, at 10:05 A.M. the system receives an SS-7 message indicating that the cellular telephone in the subscriber's automobile was turned on. The database should indicate to the system how to react to this situation. Possible reactions might be:

(1) Do nothing;

(2) Switch Forwarding Tasks to the cellular telephone number, unless the subscriber is on the system;

(3) If the subscriber is on the system, emulate a Call Waiting function (preferably a priority call waiting function) and advise the subscriber in a new conference facility that their automobile (assuming that is where the cellular telephone in question is located) may be leaving the premises without their permission;

(4) During preprogrammed time periods, telephone the subscriber at one or more preprogrammed telephone numbers using the Forward Leg Tasks to tell them (using the digitized speech capabilities previously described) in a conference facility that their automobile (assuming that is where the cellular telephone in question is located) may be leaving the premises without their permission.

The SS-7 messaging service can also be used to advise the system 40 when the subscriber powers down the cellular telephone. The SS-7 signally specification does not explicitly provide a power down message, but the system 40 can learn about a power down situation by periodically sending a packet polling the cellular system about the status of the cellular telephone. If the cellular phone is no longer available, the system 40 will know that a power down must have occurred. The database preferably tells the system how to react. For example, then the system may revert back to the subscriber's preprogrammed schedule.

Those skilled in the art will appreciate that in the described system 40, when the subscriber is barging into a call, that they are recognized by the system as the subscriber and are given certain privileges. For example, in the disclosed embodiment, only the subscriber can force the forward leg(s) to disconnect by entering a code (#8)—see steps 266 and 267 on FIG. 4b(5). It is felt that consumers resist having to always use PINs and therefore the disclosed system does not require a PIN on the forwarding leg—indeed it is felt that it would often be dysfunctional. However, one modification which probably would be accepted in the marketplace would be to include the ability for the subscriber to enter an optional PIN on a forwarding leg. Thus, after the party answering the telephone on a forwarding leg enters the valid PIN for the subscriber who is being sought, they would be given subscriber status (i.e. the ability to force other forwarding legs to disconnect). Indeed, the monitoring mode could be disabled on the forward leg until the PIN were entered.

Another modification which might be desirable would be to automatically give subscriber status to persons answering the telephone at certain forwarding numbers (and perhaps only at certain times), as stored in the database. For example, if a call is forwarded to the telephone 76 on the subscriber's desk at their office, the database could tell the system to assume that the party answering that telephone is the subscriber and to give them subscriber status. On the other hand, if a call is forwarded to the telephone 16 at the subscriber's home, the database could tell the system to assume that the party answering that telephone is not the subscriber unless they enter a PIN. These assumptions could be, of course, reversed, by making appropriate entries in the database. Similarly, subscriber status could be automatically granted if the forward leg call is answered within a certain time limit or within a certain number of rings. Thus, it would be useful where the forward leg call goes to a subscriber's office and the subscriber has a no-answer forwarding featured turned on to forward the call to their secretary, say after two unanswered rings. If the subscriber is not in their office and the call is forwarded to their secretary after two rings, the subscriber status could be disabled by the third ring (at the secretary's desk).

The changes needed to the disclosed flow charts to implement such capabilities are not extensive. For example, the forward leg on FIG. 4e(3) could be enlarged to include a test for a PIN similar to the testing done at steps 248, 252 and 249 on FIG. 4b(4). Thus, a step similar to step 252 would a test for a valid subscriber PIN, and to set a "subscriber on forwarding leg" variable true if detected (of course, the database could set that variable true without the need of the answeree to enter a PIN). The loop on FIG. 4e(3) would then test additionally for the "subscriber on forwarding leg" variable at steps 562.1 and 570.

The processing on FIGS. 2b(5) and 5e(3) allow the subscriber to toggle between two conferences or to join two conferences together. Those skilled in the art realize that it is relatively straight forward to allow additional conferences to be set up. Indeed, since the outbound calling feature implemented by subroutines 277 and 577 require an additional conference to make an outbound call, it would be desirable to allow more than two conferences to be set up. The problem which arises is that humans are not particularly adept at keeping track of more than two conferences. Thus, while the toggling feature can easily be set up conceptually to stack the conferences, or arrange them in a ring, and to merely proceed to the next conference in the stack, or the ring, when the subscriber enters the  keys, the problem is that a human is apt to forget who is in which conference. There is a possible solution to this problem. The system should be able to identify who, and where, and keep track of that information for the subscriber. For example, using CLID and a database, the system might know the name (or some other identifying feature) of a caller. At least the caller's telephone number should be known. Similarly with outbound calls—since the system preferably looks up the destination phone number in a database (see step 277.2 or 577.2), then the system also has identifying information available to it about outbound calls as well. This identifying information can be supplied to the subscriber as the caller switches (toggles) among active conferences. When switching conferences, the system plays a joining tone in the switched-to conference at steps 265.1 and 565.1. At more or less the same time the system could also generate sounds, or speech, telling the subscriber which conference is being entered. For example, the system might play "Home", "Your Secretary", or "Ms. Anderson" as the subscriber switches. The messages might include a conference number, thusly: "One, Home", "Two, Your Secretary", and, "Three, Ms. Anderson". The conference joining feature (steps 270, 271, 272 and 272.1 or 570, 570.1, 571, 572 and 572.1**) may be modified to play the identifying information for each active conference, and ask the subscriber which conferences should be joined together. For example, if three conferences were active, upon entering the #3 keys the system might respond as follows:

(1) By saying: "There are three active conferences which may be joined together. Should "Home" (or "One Home") be joined?"
(2) The system would then wait for the subscriber to enter a * key (meaning yes), or a # key (meaning no). The testing would be done in a loop similar to steps 243 and 244.
(3) Next the system might generate: "Thank you. Should "Your Secretary" (or "Two Your Secretary") be joined?
(4) Step (2) above is then repeated for conference number two.
(5) Step (3) is then repeated for conference number three.
(6) Step (2) is again repeated for the last conference.
(7) The conferences for which the subscriber entered the "yes" key (i.e., the * key in this example), would then be joined with a joining tone being played as at steps 272.1 and 572.1.

Having described a preferred embodiment of the invention, further modification and changes may now suggest themselves to those skilled in the art. The invention, therefore, is not to be limited to the disclosed embodiments as many changes and modifications will doubtless occur. Rather, the invention is to be defined by the scope of the accompanying claims.

What is claimed is:

1. A method of placing a caller into telecommunication with a subscriber, the method comprising the steps of:
   (i) detecting receipt of a call from said caller directed to said subscriber;
   (ii) in response to receipt of said call, initiating a page to said subscriber and at the same time initiating a forward leg call to a stored telephone network address;
   (iii) placing said forward leg call in at least half duplex telecommunication with said caller, if answered; and
   (iv) detecting receipt of a call from said subscriber, and, in response thereto, placing said subscriber in at least half duplex telecommunication with said caller.

2. The method as claimed in claim 1, and while said subscriber is in telecommunication with the first mentioned caller:
   detecting receipt of a new call from a new caller directed to said subscriber, sending a signal to said subscriber indicating that said new call has been detected, and, responsive to a command entered by said subscriber, disconnecting said subscriber from the first mentioned caller and connecting said subscriber instead with the new caller.

3. The method of claim 2, further including detecting the receipt of a conference command signal to place the first mentioned caller and said new caller into a conference connection with said subscriber and, in response to receipt of said conference command signal, placing the first mentioned caller and said new caller into said conference connection with said subscriber.

4. The method as claimed in claim 1, and when said caller, said subscriber and a party on said forward leg are in telecommunication with each other, sensing a command entered by said subscriber to disconnect said party and disconnecting said party in response thereto.

5. The method as claimed in claim 1, and when said caller, said subscriber and a party an said forward leg are all in telecommunication with each other, allowing ant one of said party, said caller and said subscriber to disconnect thereby leaving two of said party, said caller and said subscriber in the telecommunication with each other.

6. The method as claimed in claim 1, and when at least two of (i) said caller, (ii) said subscriber and (iii) a party on said forward leg are in telecommunication with each other, sensing a command entered by at least one of said two to add a further forward leg to said telecommunication.

7. The method as claimed in claim 6, wherein the sensing step senses a command entered by any party in the telecommunication to add a further forward leg to said telecommunication.

8. The method as claimed in claim 6, wherein said further forward leg is a connection made to a voice mail system.

9. The method as claimed in claim 6, wherein said further forward leg is an outbound telephone call made to a third party.

10. The method as claimed in claim 1, and when at least two of (i) said caller, (ii) said subscriber and (iii) a party on said forward leg are in telecommunication with each other, sensing a command entered by at least one of said two to record a voice memo and recording said voice memo in response to said command.

11. The method as claimed in claim 1, wherein said subscriber is initially placed in half duplex communication with said caller and thereafter, in response to a command entered by said subscriber, the communication between the subscriber and the caller is changed to full duplex communication.

12. The method claimed in claim 1, wherein a party answering a forward leg call may hang up before the subscriber is placed into communication with the caller without disconnecting the caller.

13. The method as claimed in claim 12, wherein the caller is connected to a voice mail system in response to a command entered by the caller.

14. The method as claimed in claim 12, wherein the caller is connected to a voice mail system after waiting for the subscriber for a period of time.

15. The method of placing a caller into telecommunication with a subscriber as claimed in claim 13, wherein, when the caller is connected to voice mail, the subscriber may listen to the caller's communications with voice mail in a listen mode wherein said subscriber cannot be heard by said caller.

16. The method as claimed in claim 1, wherein the caller is connected to a voice mail system in response to a command entered by the caller.

17. The method of claim 1, wherein said subscriber is placed in half duplex telecommunication with said caller in response to detecting receipt of a call from said subscriber.

18. The method of claim 1, wherein multiple forward leg calls are initiated to different stored telephone addresses concurrently.

19. The method of claim 1, wherein in step (ii) multiple forward leg calls are initiated concurrently to different locations.

20. The method of claim 1, wherein, when the caller is connected to voice mail, the subscriber may listen to the caller's communications with voice mail in a listen mode wherein said subscriber cannot be detected by said caller.

21. A method of placing a caller into telecommunication with a subscriber, the method comprising the steps of:
  (i) detecting receipt of a call from said caller directed to said subscriber;
  (ii) in response to receipt of said call, initiating a page to said subscriber and at the same time initiating a forward leg call to a stored telephone network address;
  (iii) connecting said call from said caller with a voice mail facility;
  (iv) connecting a party answering said forward leg call in at least half duplex telecommunication with said caller while said caller is connected to said voice mail facility; and
  (v) detecting receipt of a command from said party and, in response thereto, placing said party in full duplex telecommunication with said caller.

22. The method of claim 21, wherein said party is placed in half duplex telecommunication with said caller while said caller is connected to said voice mail facility.

23. The method of claim 21, wherein said subscriber is placed in half duplex telecommunication with said caller in response to sensing receipt of a call from said subscriber.

24. The method of placing a caller into telecommunication with a subscriber as claimed in claim 21, further including the steps of:
  (vi) initiating a page to a subscriber;
  (vii) sensing receipt of a call from said subscriber in response to said page, and placing said subscriber in at least half duplex telecommunication with said caller; and
  (viii) detecting receipt of a command from said subscriber and, in response thereto, placing said subscriber in full duplex telecommunication with said caller.

25. The method of claim 21, and when said subscriber, said caller, and said party on said forward leg are in telecommunication with each other, sensing a command entered by said subscriber to disconnect said party and disconnecting said party in response thereto.

26. The method of claim 21, and when at least two of (i) said caller, (ii) said subscriber and (iii) said party are in telecommunication with each other, sensing a command entered by at least one of said two to add a further forward leg to said telecommunication and adding said further forward leg in response to said command.

27. The method of claim 26, wherein said further forward leg is an outbound telephone call made to a third party.

28. The method of claim 21, and wherein at least two of (i) said caller, (ii) said subscriber and (iii) said party are in telecommunication with each other, sensing a command entered by at least one of said two to record a voice memo and recording said voice memo in response to said command.

29. The method of claim 21, wherein said party is initially placed in at least half duplex communication with said caller and thereafter, in response to a command entered by said party, the communication between the party and the caller is changed to full duplex communication.

30. A method of placing a caller into telecommunication with a subscriber, the method comprising the steps of:
  (i) detecting receipt of a call from said caller directed to said subscriber;
  (ii) in response to receipt of said call, initiating a page to said subscriber and at least one forward leg call to a telephone network address;
  (iii) connecting said caller with a message service;
  (iv) sensing receipt of a call from said subscriber and placing said subscriber in half duplex telecommunication with said caller while said caller is connected to said message service;
  (v) detecting receipt of a command from said subscriber and, in response thereto, placing said subscriber in full duplex telecommunication with said caller; and
  (vi) providing a party answering said forward leg call with an opportunity to be put in half duplex telecommunication with said caller.

31. The method of claim 30, further including the steps of:
  (vii) initiating at least a second concurrent forward leg call in response to receipt of the call from the caller; and
  (viii) responding to a command by said subscriber to disconnect at least one of said forward leg calls.

32. A method of placing a caller into telecommunication with a subscriber, the method comprising the steps of:
  (i) detecting receipt of a call from said caller directed to said subscriber;
  (ii) in response to receipt of said call, initiating a forward leg call to a stored telephone network address and initiating a page to a subscriber;

(iii) connecting a party answering said forward leg call in at least half duplex telecommunication with said caller;

(iv) sensing receipt of a call from said subscriber and placing said subscriber in at least half duplex telecommunication with said caller; and (v) detecting receipt of a command from said subscriber and, in response thereto, placing said subscriber in full duplex telecommunication with said caller.

* * * * *